United States Patent
Cai

(10) Patent No.: US 11,722,300 B2
(45) Date of Patent: Aug. 8, 2023

(54) CHIP, PRIVATE KEY GENERATION METHOD, AND TRUSTED CERTIFICATION METHOD

(71) Applicant: Huawei Technologies Co., Ltd., Shenzhen (CN)

(72) Inventor: Heng Cai, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 168 days.

(21) Appl. No.: 17/181,841

(22) Filed: Feb. 22, 2021

(65) Prior Publication Data

US 2021/0176056 A1    Jun. 10, 2021

Related U.S. Application Data

(63) Continuation of application No. PCT/CN2018/109537, filed on Oct. 9, 2018.

(51) Int. Cl.
*H04L 9/08*    (2006.01)
*H04L 9/32*    (2006.01)

(52) U.S. Cl.
CPC .......... *H04L 9/0897* (2013.01); *H04L 9/0825* (2013.01); *H04L 9/3263* (2013.01); *H04L 9/3271* (2013.01); *H04L 2209/12* (2013.01)

(58) Field of Classification Search
CPC . H04L 9/0897; H04L 9/0825; H04L 9/32631; H04L 9/3271; H04L 2209/12; H04L 9/0877; H04L 9/0891; H04L 9/3242; H04L 9/3247; H04L 9/3265; G06F 21/57; G06F 21/72

See application file for complete search history.

(56) References Cited

U.S. PATENT DOCUMENTS

| | | |
|---|---|---|
| 6,760,441 B1 | 7/2004 | Ellison et al. |
| 9,037,875 B1 | 5/2015 | Poo et al. |
| 2010/0070769 A1 | 3/2010 | Shima et al. |
| 2011/0154501 A1 | 6/2011 | Banginwar et al. |

(Continued)

FOREIGN PATENT DOCUMENTS

| | | |
|---|---|---|
| CN | 1421000 A | 5/2003 |
| CN | 1553349 A | 12/2004 |

(Continued)

OTHER PUBLICATIONS

Trusted Computing Group, "Implicit Identity Based Device Attestation", Version 1.0, Revision 0.93 (Year: 2018).*

(Continued)

*Primary Examiner* — Kambiz Zand
*Assistant Examiner* — Yohannes Wallelign Minwuyelet
(74) *Attorney, Agent, or Firm* — Huawei Technologies Co., Ltd.

(57) ABSTRACT

A chip includes a security core module. The security core module includes a security core and a memory. The security core module prevents access of an external module that is inside the chip and that is other than the security core module, and the security core module prevents access of an external device outside the chip. The security core is configured to generate a layer 1 public key and a layer 1 private key based on a hash of a first root public key and a UDS of the chip stored in the memory; and the memory is configured to store the layer 1 private key.

16 Claims, 8 Drawing Sheets

(56) References Cited

U.S. PATENT DOCUMENTS

| | | |
|---|---|---|
| 2013/0246279 A1 | 9/2013 | Everett |
| 2014/0010371 A1 | 1/2014 | Khazan et al. |
| 2016/0164683 A1 | 6/2016 | Barney et al. |
| 2016/0301671 A1 | 10/2016 | Dahlstrom et al. |
| 2017/0277898 A1* | 9/2017 | Powell .................... G06F 21/53 |
| 2018/0198620 A1* | 7/2018 | Pearson ................ H04L 9/3247 |
| 2019/0362082 A1* | 11/2019 | Schramm .............. G06F 21/606 |
| 2020/0379979 A1* | 12/2020 | Thekadath .......... G06F 16/2379 |

FOREIGN PATENT DOCUMENTS

| | | |
|---|---|---|
| CN | 101430747 A | 5/2009 |
| CN | 102123031 A | 7/2011 |
| CN | 103514414 A | 1/2014 |
| CN | 107908574 A | 4/2018 |
| CN | 108429719 A | 8/2018 |
| CN | 108460282 A | 8/2018 |

OTHER PUBLICATIONS

Gao, D., "The Design and Implementation of PCI Password Card," Zhengzhou University, May 2013, with an English abstract, 68 pages.

* cited by examiner

CHIP, PRIVATE KEY GENERATION METHOD, AND TRUSTED CERTIFICATION METHOD

CROSS-REFERENCE TO RELATED APPLICATIONS

This is a continuation of Int'l Patent App. No. PCT/CN2018/109537 filed on Oct. 9, 2018, which is incorporated by reference.

FIELD

This disclosure relates to the field of information technologies, and more particularly, to a chip, a private key generation method, and a trusted certification method.

BACKGROUND

Some chips in a computer device impose a relatively high requirement on security. Once malicious code is implanted into operating systems or applications (APPs) that are run by these chips, an attacker can easily obtain control over the computer device or obtain data in the computer device.

For example, a baseboard management controller (BMC) in a server is such a chip that imposes a relatively high requirement on security. The BMC uses a network interface to implement functions, such as providing remote maintenance of the server and monitoring a running status of the server. The BMC may further obtain running status information of a central processing unit (CPU) inside the server. The BMC may further manage a basic input/output system (BIOS) inside the server. Once an attacker implants malicious BMC firmware by exploiting a vulnerability on the BMC side, the attacker can easily obtain control over the server or obtain data in the server.

Currently, in the industry, a challenge device verifies certificates of firmware at all layers that is run by a chip, to ensure that the firmware run by the chip is trustworthy. A trusted certification process currently used in the industry has the following disadvantage: If a private key is leaked, an attacker can use the private key to sign firmware containing malicious code. Therefore, a method for ensuring private key security is needed.

SUMMARY

Various embodiments provides a chip, a private key generation method, and a trusted certification method, to reduce a probability that an attacker obtains a private key and performs trusted certification on tampered firmware or information by using the private key.

According to a first aspect, an embodiment of various embodiments provides a chip. The chip includes a security core module, the security core module includes a security core and a memory, the security core module prevents access of an external module that is inside the chip and that is other than the security core module, and the security core module prevents access of an external device outside the chip; the memory is configured to store a hash of a first root public key and a unique device secret UDS of the chip; the security core is configured to generate a layer 1 public key and a layer 1 private key based on the hash of the first root public key and the UDS; and the memory is configured to store the layer 1 private key. In the foregoing technical solution, because the layer 1 private key is stored in the memory in the security core module, and the security core module prevents external access, a component outside the security core module cannot access the memory that stores the layer 1 private key. This can reduce a possibility that an attacker obtains the layer 1 private key and performs trusted certification on tampered firmware or information by using the layer 1 private key. In addition, because the security core module is integrated into the chip, production costs of the chip are relatively low, and there is a relatively low requirement on layout space of a circuit board in which the chip is disposed.

With reference to the first aspect, in an example implementation of the first aspect, an address of the security core module is beyond an address range that is accessible by the external module and the external device. According to the foregoing technical solution, a component inside the security core module cannot be accessed by the component outside the security core module.

With reference to the first aspect, in an example implementation of the first aspect, the memory is further configured to store a hash of a second root public key; the security core is further configured to generate a layer 2 public key and a layer 2 private key based on the hash of the second root public key and the UDS; the memory is further configured to store the layer 2 private key; and the security core is further configured to sign a layer 2 certificate by using the layer 1 private key, where the layer 2 certificate includes the layer 2 public key. In the foregoing technical solution, security core firmware includes only layer 1 firmware and layer 2 firmware and has a simple running environment, but can still implement a trusted certification process for firmware or data.

With reference to the first aspect, in an example implementation of the first aspect, the security core is further configured to delete the layer 1 private key after signing the layer 2 certificate by using the layer 1 private key. This can avoid forging the layer 2 certificate due to leakage of the layer 1 private key.

With reference to the first aspect, in an example implementation of the first aspect, the security core is further configured to: run secure firmware when receiving verification request information that is to target data and that is sent by a challenge device, to sign the target data based on the layer 2 private key; and send the signed target data to the challenge device, such that the challenge device verifies the signed target data based on the layer 2 public key. In this way, trusted certification can be implemented by using the security core.

With reference to the first aspect, in an example implementation of the first aspect, the security core is further configured to: run secure firmware when receiving verification request information that is to target data and that is sent by a challenge device, to sign the target data based on the layer 1 private key; and send the signed target data to the challenge device, such that the challenge device verifies the signed target data based on the layer 1 public key. In this way, trusted certification can be implemented by using the security core.

With reference to the first aspect, in an example implementation of the first aspect, the chip further includes a service core configured to run service core firmware. In other words, original functions of the service core inside the chip remain unchanged. Therefore, the chip is changed relatively slightly.

With reference to the first aspect, in an example implementation of the first aspect, the chip further includes a first input/output interface and a second input/output interface, the first input/output interface is coupled to the security core module, and the second input/output interface is coupled to the service core. In this way, the security core module and the service core do not have common communications interfaces, and the security core can be further isolated from the service core.

According to a second aspect, an embodiment provides a private key generation method, where the method is performed by a security core in a chip. The security core is located in a security core module inside the chip, the security core module further includes a memory configured to store a hash of a first root public key and a unique device secret UDS of the chip, the security core module prevents access of an external module that is inside the chip and that is other than the security core module, and the security core module prevents access of an external device outside the chip. The method includes: obtaining, by the security core, the hash of the first root public key and the UDS from the memory; generating, by the security core, a layer 1 public key and a layer 1 private key based on the hash of the first root public key and the UDS; and writing, by the security core, the layer 1 private key into the memory. In the foregoing technical solution, because the layer 1 private key is stored in the memory in the security core module, and the security core module prevents external access, a component outside the security core module cannot access the memory that stores the layer 1 private key. This can reduce a possibility that an attacker obtains the layer 1 private key and performs trusted certification on tampered firmware or information by using the layer 1 private key.

With reference to the second aspect, in an example implementation of the second aspect, the memory is further configured to store a hash of a second root public key, and the method further includes: obtaining, by the security core, the hash of the second root public key from the memory; generating, by the security core, a layer 2 public key and a layer 2 private key based on the hash of the second root public key and the UDS; writing, by the security core, the layer 2 private key into the memory; and signing, by the security core, a layer 2 certificate by using the layer 1 private key, where the layer 2 certificate includes the layer 2 public key. In the foregoing technical solution, security core firmware includes only layer 1 firmware and layer 2 firmware and has a simple running environment, but can still implement a trusted certification process for firmware or data.

With reference to the second aspect, in an example implementation of the second aspect, the method further includes: deleting, by the security core, the layer 1 private key after signing the layer 2 certificate by using the layer 1 private key. This can avoid forging the layer 2 certificate due to leakage of the layer 1 private key.

With reference to the second aspect, in an example implementation of the second aspect, the method further includes: obtaining, by the security core, verification request information that is to target data and that is sent by a challenge device; signing, by the security core, the target data based on the layer 2 private key; and sending, by the security core, the signed target data to the challenge device, such that the challenge device verifies the signed target data based on the layer 2 public key. In this way, trusted certification can be implemented by using the private key generated by the security core.

With reference to the second aspect, in an example implementation of the second aspect, the method further includes: obtaining, by the security core, verification request information that is to target data and that is sent by a challenge device; signing, by the security core, the target data based on the layer 1 private key; and sending, by the security core, the signed target data to the challenge device, such that the challenge device verifies the signed target data based on the layer 1 public key. In this way, trusted certification can be implemented by using the private key generated by the security core.

According to a third aspect, an embodiment provides a trusted certification method, where the method includes: obtaining, by a security core in a security core module inside a chip, verification request information that is to target data and that is sent by a challenge device, where the security core module prevents access of an external module that is inside the chip and that is other than the security core module, and the security core module prevents access of an external device outside the chip; signing, by the security core, the target data based on a private key stored in a memory in the security core module; and sending, by the security core, the signed target data to the challenge device. In the foregoing technical solution, trusted certification can be performed by using the private key stored in the security core module. In addition, in the foregoing technical solution, because the private key used for trusted certification is stored in the memory in the security core module, and the security core module prevents external access, a component outside the security core module cannot access the memory that stores the private key. This can reduce a possibility that an attacker obtains the private key and performs trusted certification on tampered firmware or information by using the private key.

With reference to the third aspect, in an example implementation of the third aspect, the obtaining, by a security core in a security core module inside a chip, verification request information sent by a challenge device includes: reading, by the security core, the verification request information stored in storage space of the memory in the chip.

With reference to the third aspect, in an example implementation of the third aspect, before the reading, by the security core, the verification request information stored in the memory in the chip, the method further includes: receiving, by the security core, indication information sent by a service core inside the chip, where the indication information instructs the security core to read the storage space of the memory in the chip.

With reference to the third aspect, in an example implementation of the third aspect, a type of the target data includes firmware run by hardware in a target device, a hash of the firmware run by the hardware in the target device, data generated in a running process of the target device, and data stored in the target device, where the target device is a device in which the chip is disposed.

DETAILED DESCRIPTION

Figure 1:
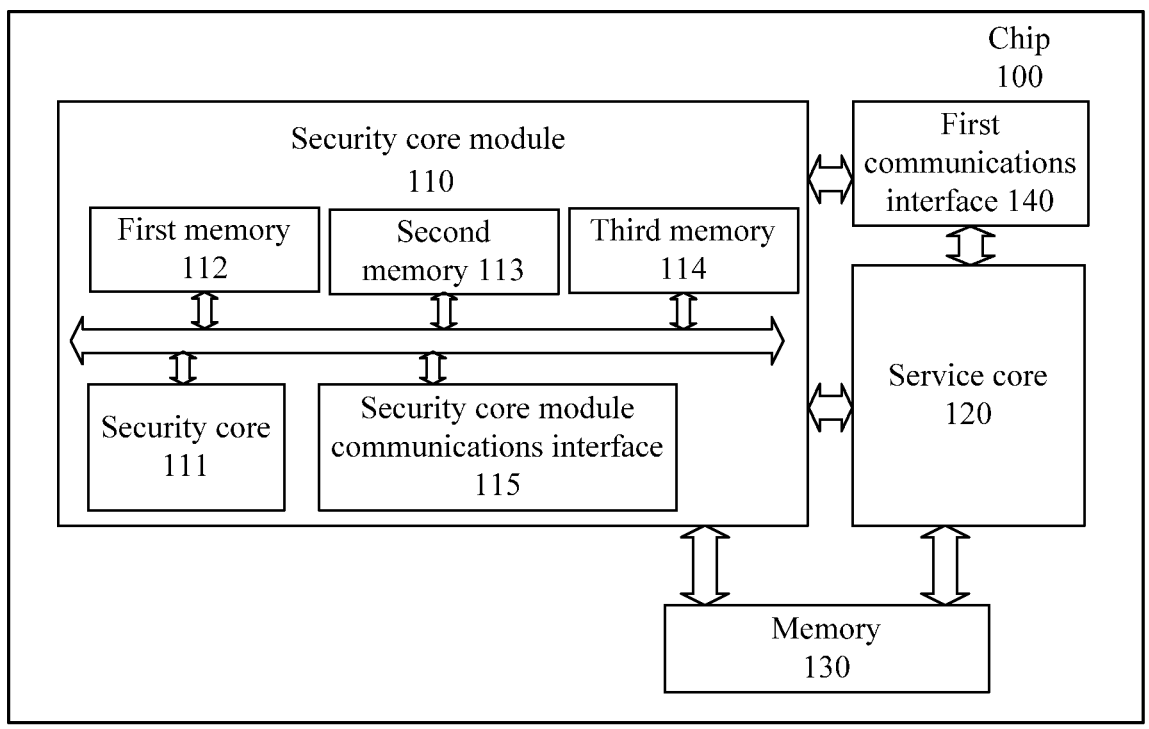
FIG. 1 is a structural block diagram of a chip according to an embodiment.

The following describes technical solutions in various embodiments with reference to the accompanying drawings.

In various embodiments, "at least one" means one or more, and "a plurality of" means at least two. The term "and/or" describes an association relationship between associated objects, and indicates that three relationships may exist. For example, A and/or B may indicate the following: Only A exists, both A and B exist, and only B exists, where A and/or B may indicate a singular or plural form. The character "/" generally indicates an "or" relationship between the associated objects. "At least one of the following" or a similar expression thereof indicates any combination of the following, and includes any combination of one or more of the following. For example, at least one of a, b, or c may indicate: a, b, c, a-b, a-c, b-c, or a-b-c, where at least one of a, b, or c may indicate a singular or plural form. In addition, in various embodiments, the terms such as "first" and "second" are not intended to limit a quantity or an execution sequence.

It should be noted that, in various embodiments, the term such as "example" or "for example" represents giving an example, an illustration, or a description. Any embodiment or design scheme described as an "example" or "for example" in various embodiments should not be interpreted as being preferred or having advantages over another embodiment or design scheme. Exactly, use of the term such as "example" or "for example" is intended to present a related concept in a specific manner.

To help a person skilled in the art better understand the technical solutions in various embodiments, some concepts in various embodiments are first described.

A "core" mentioned in the embodiments of various embodiments is, for example, a CPU core, that is, an arithmetic logic unit (ALU).

Firmware may have different definitions, and all appropriate interpretations in the computer field are applicable to various embodiments. For example, there may be the following interpretations. The following interpretations are merely examples for description, but should not be construed as any limitation on the technical solutions in various embodiments.

The firmware may be interpreted as a program that is pre-installed in a read-only memory inside a hardware product and that is adapted to the hardware product. For example, a BIOS of a computer belongs to a type of firmware.

The firmware may alternatively be interpreted as a program running in a "non-control processor". The "non-control processor" is a processor that indirectly runs an operating system, for example, a processor in a peripheral device. Alternatively, the "non-control processor" may refer to some cores inside a processor that are used for a bare metal virtual machine system.

The firmware may alternatively be interpreted as special computer software. The firmware may provide low-level control for hardware in a computer device. For example, the firmware may provide a running environment for more complex software in the computer device. For another example, in a less complex computer device, the firmware may act as a complete operating system of the computer device, to perform all control, monitoring, and data operation functions. Different functions of the computer device may be implemented by different firmware. For example, operating system firmware may be used to run an operating system, and u-boot firmware may be used to boot running of the operating system firmware. APP firmware runs an APP running in the operating system, and different APPs may be implemented by different APP firmware. A core inside the computer device runs the firmware by running firmware code.

In various embodiments, a security chip is a chip that can perform a trusted certification process to verify security of external firmware, and the external firmware is firmware stored outside a security core module inside the security chip. The external firmware may be stored in a memory in the chip, or may be stored in a memory outside the chip. Chips shown in FIG. 1 and FIG. 7 in various embodiments may be considered as security chips.

Firmware run by a security core may be referred to as security core firmware. Layer 1 firmware and layer 2 firmware mentioned in embodiments in FIG. 1 to FIG. 7 in various embodiments are both security core firmware. Firmware run by a service core may be referred to as service core firmware. Compared with the service core firmware, the security core firmware is simpler and has a single function. Therefore, the security core firmware is more secure.

A unique device secret (UDS) is secret information of a device, and is a random number. Once the UDS is initialized, the UDS is unalterable within a lifecycle of the device. Access permission for the unique device secret is controlled (mandatory), and the unique device secret supports DICE access only. A value of the unique device secret cannot be read by using upgradable code.

A device identity composition engine (DICE) is a software and hardware engine that complies with the DICE specification released by the trusted computing group (TCG) and used to compute a compound device identifier (CDI).

Layer 1 firmware may also be referred to as first mutable code or layer 1 code, and is first immutable software code that a core starts to execute. Storage medium content of the code can be rewritten. It should be noted that layer 0 firmware is defined as the first immutable code in some scenarios. The layer 1 firmware is defined as the first immutable code in various embodiments.

A one-way function is an injective function having the following characteristic: For each input, a function value is easily calculated, but it is relatively difficult to calculate an original input by using a given function value of a random input.

By way of example rather than limitation, trusted certification in various embodiments may be performed based on a quantity of layers of firmware. For example, assuming that four layers of firmware are run by a chip, after the chip is started, a layer 1 private key, a layer 2 private key, a layer 3 private key, and a layer 4 private key are generated. A certificate of layer 2 firmware ("layer 2 certificate") is signed by using the layer 1 private key, to obtain the signed layer 2 certificate; a certificate of layer 3 firmware ("layer 3 certificate") is signed by using the layer 2 private key, to obtain the signed layer 3 certificate; a certificate of layer 4 firmware ("layer 4 certificate") is signed by using the layer 3 private key, to obtain the signed layer 4 certificate; and signed layer 1 certificate to the signed layer 4 certificate constitute a certificate chain, where each layer of certificate in the certificate chain includes a hash of firmware at each layer and a public key at each layer. For example, the layer 1 certificate includes a hash of the layer 1 firmware and a layer 1 public key, the layer 2 certificate includes a hash of the layer 2 firmware and a layer 2 public key. The rest may be deduced by analogy. The layer 1 certificate is signed by a certificate authority (CA) by using a CA private key. After receiving a random number (e.g., a nonce) sent by a challenge device, the chip signs the certificate chain (that is, the layer 1 certificate to the layer 4 certificate) and the random number by using the layer 4 private key, and sends the signed data to the challenge device. The challenge device may calculate or store the hashes of the layer 1 firmware to the layer 4 firmware. The challenge device may further store a CA public key and a layer 4 public key. After receiving the signed data, the challenge device decrypts the signed data by using the layer 4 public key, to obtain the signed layer 1 certificate, the signed layer 2 certificate, the signed layer 3 certificate, and the signed layer 4 certificate; decrypts the signed layer 1 certificate by using the CA public key, to obtain a hash of the layer 1 firmware and the layer 1 public key; and decrypts the signed layer 2 certificate by using the layer 1 public key, to obtain a hash of the layer 2 firmware and the layer 2 public key. The rest may be deduced by analogy. If the challenge device cannot use a public key at a layer to decrypt a signed certificate at a next layer, it indicates that the certificate chain is tampered with. If successfully decrypting all the signed certificates in the certificate chain, the challenge device compares the hashes of the firmware that are obtained through decryption with the hashes of the firmware that are stored in the challenge device. If the hashes obtained through decryption are the same as the hashes stored in the challenge device, it indicates that none of the firmware run by the chip is tampered with; or if the hashes obtained through decryption are different from the hashes stored in the challenge device, it indicates that firmware run by the chip is tampered with.

FIG. 1 is a structural block diagram of a chip according to an embodiment. As shown in FIG. 1, the chip 100 includes a security core module 110, a service core 120, a memory 130, and a first communications interface 140. Certainly, the chip 100 may further include components other than the foregoing components. These modules are not enumerated one by one herein. For ease of description, the following assumes that the chip 100 is a chip disposed in a server.

It should be understood that a structure of the chip shown in FIG. 1 is merely an example for description. This is not limited in various embodiments. For example, the chip 100 may alternatively not include the service core 120. In this case, a function of the service core 120 may be provided by a chip configured in a same computing device as the chip 100 (further provided by a core that is inside the chip and that can run service firmware). Alternatively, a function of the service core 120 may be provided by a computing device that is jointly used with a computing device in which the chip 100 is configured (further provided by a core that is inside the computing device and that can run service firmware). For another example, the chip 100 may include a plurality of service cores or a plurality of memories. Different service cores may execute different service core firmware, to implement corresponding functions.

The chip shown in FIG. 1 is a chip that imposes a relatively high requirement on security, for example, a BMC in a server, a system-on-a-chip (SoC) in a terminal device, or an SoC chip in a network device.

The service core 120 may execute service core firmware, to implement corresponding functions of the chip. For example, if the chip 100 is a BMC, the service core 120 may execute the service core firmware, to implement functions that the BMC can implement, such as providing remote maintenance of the server, monitoring a running status of the server, obtaining running status information of a CPU, and other functions.

For another example, if the chip 100 is an SoC chip in a terminal device, the service core 120 may execute service core firmware, to implement functions that the SoC chip in the terminal device can implement, such as processing a communication protocol and communications data, controlling the entire terminal device, executing a software program, processing data of the software program, and other functions.

For another example, if the chip 100 is an SoC chip in a network device, the service core 120 may execute service core firmware, to implement functions that can be implemented by the SoC chip in the network device. For example, assuming that the network device is a base station, the service core 120 may execute the service core firmware to provide secure boot assurance for a baseband unit (BBU), which may also be referred to as a digital unit (DU), when the BBU is started.

The security core module 110 communicates with the memory 130 communicate through an internal connection path, to transfer a control and/or data signal.

The service core 120 communicates with the memory 130 communicate through an internal connection path, to transfer a control and/or data signal.

The memory 130 is a non-volatile memory that is writable and erasable for a plurality of times, for example, an electrically erasable programmable read-only memory (EEPROM) or a flash memory.

The security core module 110 includes a security core 111, a first memory 112, a second memory 113, a third memory 114, and a security core module communications interface 115. The security core 111 may communicate with the first memory 112, the second memory 113, and the third memory 114 through an internal connection path. For example, the security core 111 may read information stored in the first memory 112, the second memory 113, and the third memory 114; or send information to the second memory 113 and the third memory 114, and the second memory 113 and the third memory 114 may store the received information. The security core 111 may also communicate with the security core module communications interface 115 through an internal connection path. The security core 111 may send information to another component, device, or apparatus through the security core module communications interface 115; or receive, through the security core module communications interface 115, information sent by another component, device, or apparatus.

The security core module 110 may be coupled to the service core 120 through an internal connection path. The security core 111 can access a component outside the security core module 110. The security core module 110 prevents external access. Further, the security core module 110 prevents access of an external module that is inside the chip 100 and that is other than the security core module 110, and the security core module 110 prevents access of an external device outside the chip 100.

That the security core module 110 prevents access of an external module that is inside the chip 100 and that is other than the security core module 110 means that a module that is inside the chip 100 and that is other than the security core module 110 cannot access a component inside the security core module 110. For example, the service core 120 cannot access the component inside the security core module 110.

For example, the service core 120 cannot access the first memory 112, the second memory 113, or the third memory 114 in the security core module 110.

That the security core module 110 prevents access of an external device outside the chip 100 means that the external device outside the chip 100 cannot access the component inside the security core module 110. For example, a CPU inside the server cannot access the component inside the security core module 110. For example, the CPU inside the server cannot access the first memory 112, the second memory 113, or the third memory 114 in the security core module 110.

The security core 111 can access the component outside the security core module 110. For example, the security core 111 can access storage space of the service core 120, to obtain firmware run by the service core 120. For another example, the security core 111 can access the memory 130, to obtain data stored in the memory 130, or send, to the memory 130, data to be stored to the memory 130. For another example, the security core 111 can access a memory outside the chip 100, for example, a memory in the server, to obtain data stored in the memory, or send, to the memory, data desired to be stored to the memory.

In some embodiments, when the service core 120 is in a non-security mode, the security core module 110 prevents access of the service core 120. When the service core 120 is in a security mode, the service core 120 can access the component inside the security core module 110. In the security mode, the service core runs some limited code, and the code is verified secure code. When the service core is in the security mode, if the service core accesses the component inside the security core module 110, data stored in the security core module 110 is not tampered with, and the data stored in the security core module 110 is not leaked to an attacker. Therefore, accessing the component inside the security core module 110 by the service core when the service core is in the security mode is secure.

In some embodiments, the security core module 110 prevents access of the component outside the security core module 110 at any time. This can ensure that the service core 120 is completely isolated from the security core module 110, and avoid using the service core 120 to access the first memory 112, the second memory 113, and the third memory 114.

The components (that is, the security core 111, the first memory 112, the second memory 113, the third memory 114, and the like) inside the security core module 110 include a master component, a slave component, and a master/slave component. All slave components are accessible by only a master component inside the security core, and are inaccessible by external components (that is, the external device and the external module). Addresses of the slave components inside the security core module 110 are beyond an address range that is accessible by the external components.

Further, the security core module communications interface 115 that is in the security core module 110 and that communicates with another component inside the chip 100 has only a master interface, and has no slave interface. Therefore, the security core module 110 can externally initiate master access, but the component outside the security core module 110, such as the service core 120, cannot initiate master access to the component inside the security core module 110. In this case, an address of the component outside the security core module 110 is within the address range that is accessible by the security core module 110, whereas addresses of the components (such as the security core 111 and the first memory 112) inside the security core module 110 are beyond an address range that is accessible by the component outside the security core module 110. Therefore, the security core module 110 may communicate with the component outside the security core module 110 through the security core module communications interface 115, whereas the component (such as the service core 120 or a component outside the chip 100) outside the security core module 110 cannot access the components inside the security core module 110, such as the memories in the security core module 110.

The slave components inside the security core module 110 may be the memories in the security core module 110, such as the first memory 112, the second memory 113, and the third memory 114. The master component inside the security core module 110 may be the security core 111.

In some embodiments, the first memory 112 is configured to store a UDS of the chip 100. The UDS stored in the first memory 112 cannot be deleted or modified. The UDS stored in the first memory 112 cannot be deleted or modified at any time. If the UDS stored in the first memory 112 in the chip 100 is expected to be modified, the UDS can be modified only by using a new first memory. The UDS generates a layer 1 private key and a layer 1 public key. In this case, if the UDS is tampered with, an error occurs on the layer 1 private key and the layer 1 public key. Therefore, that the UDS stored in the first memory 112 cannot be modified or deleted can improve security of the chip 100. The UDS stored in the first memory 112 is unalterable by making the UDS unalterable in a locking manner. In other words, the UDS stored in the first memory 112 is locked to make the UDS unalterable.

In some embodiments, each time after the chip 100 is powered on, the UDS stored in the first memory 112 is allowed to be read only once. For example, after the chip 100 is powered on, the UDS may be read to the third memory 114. The UDS is no longer read unless the chip 100 is reset. After the UDS has been used, the UDS may be deleted from the third memory 114. The UDS is allowed to be read only once when the layer 1 public key and the layer 1 private key are generated. This can avoid that an attacker may forge the layer 1 private key and the layer 1 public key by using the UDS due to leakage of the UDS.

The first memory 112 may be a one-time programmable non-volatile memory (OTP NVM). The OTP NVM may also be referred to as a programmable read-only memory (PROM) or a one-time programmable (OTP) memory. eFuse is a typical OTP memory.

The OTP memory is a special type of non-volatile memory (NVM), and allows data to be written into the memory only once. The data written into the OTP memory may be disallowed to be deleted or modified by making the data unalterable in a locking manner. In other words, if the first memory 112 is an OTP memory, the UDS may be written into the first memory 112 in a chip manufacturing phase, and is made to be unalterable in a locking manner. In this way, the UDS written into the first memory 112 cannot be deleted or modified.

An implementation of writing the UDS into the first memory 112 is not limited in various embodiments. For example, the UDS may be a mutable random number written into the first memory 112 by using a hardware interface or a software interface in a device production process. Different devices have different UDSs. Therefore, the UDS is characterized by randomness. The device production process may be a process of fabricating the chip 100 on a circuit board. Alternatively, the UDS may be generated by a dedicated device by using a physical unclonable function (PUF)

technology in a phase of producing the chip 100, and then written into the first memory 112.

In some embodiments, the first memory 112 is configured to store a UDS of the chip 100. The UDS stored in the first memory 112 cannot be deleted or modified in a working process of the chip 100. The first memory 112 may be a memory in which data stored in the first memory 112 can be deleted or modified only by using a device. For example, the first memory 112 may be an erasable programmable read-only memory (EPROM). A quartz window is included in an EPROM package, and data in the EPROM can be deleted by shining strong ultraviolet light through the quartz window. Usually, the quartz window of the EPROM into which the data is written is covered, to protect against direct sunlight. Therefore, the data in the EPROM cannot be deleted or modified in the working process of the chip 100.

In some embodiments, the first memory 112 may include a secure boot indicator bit. After writing of data in the first memory 112 is completed, the secure boot indicator bit is set to be enabled. For example, if a value of the secure boot indicator bit is 0, it indicates that the secure boot indicator bit is not enabled. In this case, writing of the data in the first memory 112 is not completed. If a value of the secure boot indicator bit is 1, it indicates that the secure boot indicator bit is enabled. In this case, writing of the data in the first memory 112 is completed.

The first memory 112 may further store first check information. The first check information is related information used to check layer 1 firmware.

In some embodiments, the first check information may include a hash of a first root public key, first revocation identification information, and first security version number information.

In some embodiments, the first memory 112 may store only the hash of the first root public key. The first revocation identification information and/or the first security version number information may be stored in the second memory 113.

Optionally, in some other embodiments, all content in the first check information may be stored in the first memory 112.

Similar to the UDS stored in the first memory 112, the hash of the first root public key that is stored in the first memory 112 is disallowed to be deleted or modified. Further, after being written into the first memory 112, the hash of the first root public key is made to be unalterable in a locking manner. In other words, the hash of the first root public key that is written into the first memory 112 is locked to make the hash of the first root public key unalterable. This can avoid that the layer 1 firmware cannot be checked because of modification of the hash of the first root public key.

Similar to the UDS stored in the first memory 112, in some embodiments, the hash of the first root public key that is stored in the first memory 112 is disallowed to be deleted or modified in the working process of the chip 100.

If the first memory 112 further stores the first revocation identification information, the first revocation identification information can be modified. A modification manner is modifying 0 in the first revocation identification information to 1. However, 1 in the first revocation identification information cannot be modified to 0. For example, 10 is a revocation identifier included in the first revocation identification information, and 10 can be modified to 11 but cannot be modified to 00 or 01.

If the first memory 112 further stores the first security version number information, the first security version number can be modified. A modification manner is modifying 0 in the first security version number information to 1. However, 1 in the first security version number information cannot be modified to 0. For example, 10 is a security version number included in the first security version number information, and 10 can be modified to 11 but cannot be modified to 00 or 01.

In some embodiments, the first check information may include only the hash of the first root public key.

Optionally, in some other embodiments, the first check information may include the hash of the first root public key, and the first check information may further include either the first revocation identification information or the first security version number information.

The second memory 113 is configured to store boot (e.g., boot read-only memory (ROM)) code.

The second memory 113 is an NVM. For example, the second memory 113 may be a ROM, a PROM, an EPROM, an OTP NVM, an EEPROM, or a flash memory.

The third memory 114 may be a writable/readable memory, that is, a memory that is writable and erasable for a plurality of times. For example, the third memory 114 may be a random-access memory, such as a static random-access memory (SRAM) or a dynamic random-access memory (DRAM). Alternatively, the third memory may be a memory that is writable and erasable for a plurality of times, such as an EEPROM or a flash memory.

The NVM includes an OTP NVM. Therefore, in some embodiments, the first memory 112 and the second memory 113 may be implemented by one memory. The memory may implement functions of the first memory 112 and the second memory 113. The memory may be configured to store the UDS, the first check information, and the boot code. Certainly, in this embodiment, the function of the first memory 112 and the function of the second memory 113 may alternatively be implemented respectively by using two OTP NVMs.

Some NVMs such as an EEPROM and a flash memory are also writable and erasable for a plurality of times. Therefore, in some embodiments, the second memory 113 and the third memory 114 may also be implemented by one memory. The memory is an NVM that is writable and erasable for a plurality of times. The memory may implement functions of the second memory 113 and the third memory 114. The memory may be configured to store the boot code and duplicate layer 1 firmware. Certainly, in this embodiment, the function of the second memory 113 and the function of the third memory 114 may alternatively be implemented respectively by using two NVMs that are writable and erasable for a plurality of times.

Figure 2:
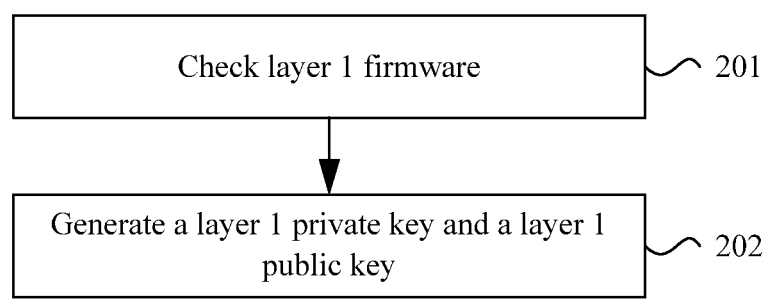
FIG. 2 is a schematic flowchart for constructing a trusted identity of layer 1 firmware according to an embodiment.

The security core 111 may be configured to perform a method shown in FIG. 2, to complete trusted identity construction for the layer 1 firmware.

FIG. 2 is a schematic flowchart for constructing a trusted identity of layer 1 firmware according to an embodiment.

201. The security core 111 checks the layer 1 firmware.

If the security core 111 successfully checks the layer 1 firmware, step 202 is performed. For a process of checking the layer 1 firmware by the security core 111, refer to a flowchart shown in FIG. 3.

In some embodiments, if the security core 111 fails in checking the layer 1 firmware, the security core 111 stops running, sends a check failure indication message, and informs a user that the security core 111 fails in checking the layer 1 firmware.

Optionally, in some other embodiments, if the security core 111 fails in checking the layer 1 firmware, the security core 111 may check backup layer 1 firmware. If the security core 111 successfully checks the backup layer 1 firmware, step 202 is performed. If the security core 111 still fails in checking the backup layer 1 firmware, the security core 111 stops running, sends a check failure indication message, and informs a user that the security core 111 fails in checking the layer 1 firmware.

202. The security core 111 generates a layer 1 private key and a layer 1 public key.

Figure 4:
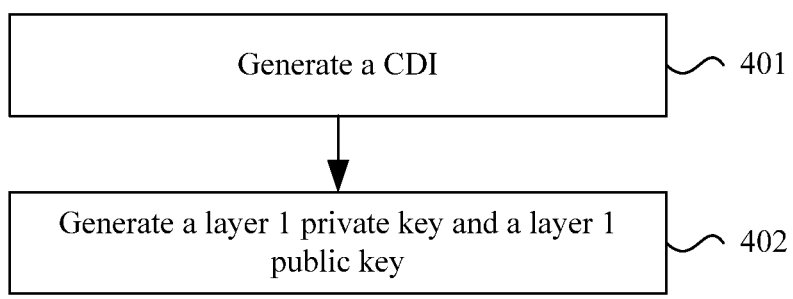
FIG. 4 is a schematic flowchart for generating a layer 1 private key and a layer 1 public key according to an embodiment.

For a process of generating the layer 1 private key and the layer 1 public key by the security core 111, refer to a flowchart shown in FIG. 4.

Figure 3:
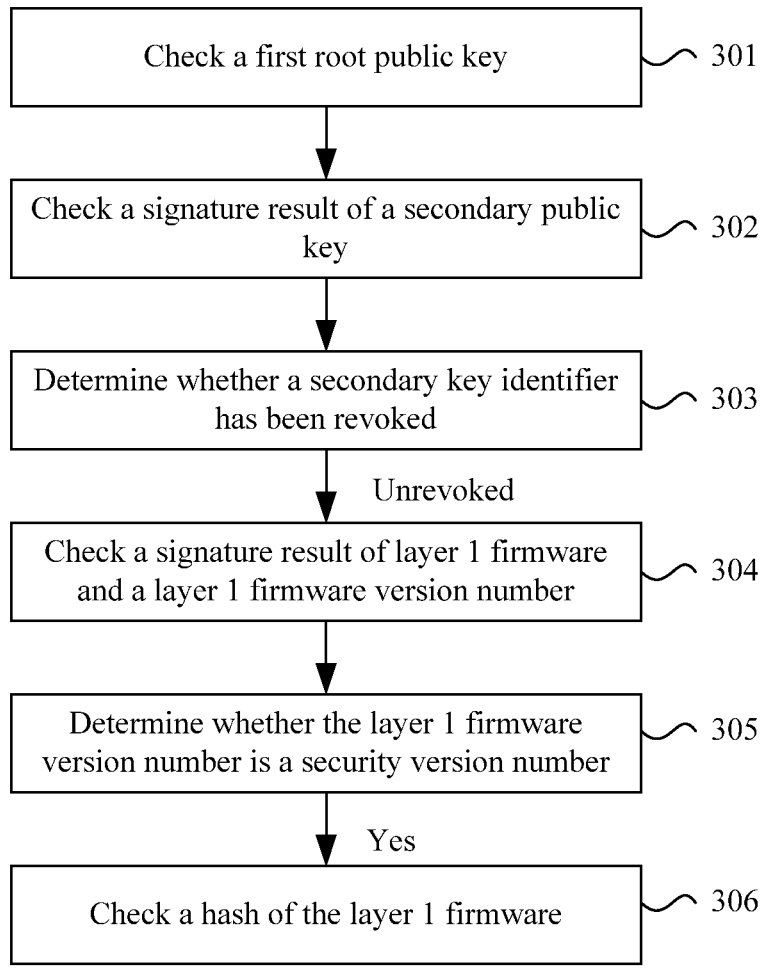
FIG. 3 is a schematic flowchart for checking layer 1 firmware according to an embodiment.

FIG. 3 is a schematic flowchart for checking layer 1 firmware according to an embodiment.

The security core 111 implements a process of checking the layer 1 firmware shown in FIG. 3 by executing the Boot-Rom code stored in the second memory 113.

Further, the security core 111 checks the layer 1 firmware based on first check information and layer 1 firmware check related information.

The layer 1 firmware check related information includes a first root public key, a signature result of a secondary public key, the secondary public key, and a signature result of the layer 1 firmware and a layer 1 firmware version number. The layer 1 firmware check related information may further include any one or more of the following information: a secondary key identifier (ID) and the layer 1 firmware version number.

A memory configured to store the layer 1 firmware and the layer 1 firmware check related information is not limited in this embodiment of various embodiments. For example, in some embodiments, the layer 1 firmware and the layer 1 firmware check related information may be stored in the second memory 113. In some other embodiments, the layer 1 firmware and the layer 1 firmware check related information may be stored in a memory outside the security core module 110. For example, the layer 1 firmware and the layer 1 firmware check related information may be stored in the memory 130. For another example, the layer 1 firmware and the layer 1 firmware check related information may be stored in a memory outside the chip 100, for example, a memory in a server.

In some embodiments, the security core 111 may copy the layer 1 firmware into the third memory 114. In this way, when checking the layer 1 firmware, the security core 111 may directly read the layer 1 firmware from the third memory 114, without reading the layer 1 firmware from the memory outside the security core module 110. The security core 111 accesses the third memory 114 faster than accesses the memory outside the security core module 110. Therefore, copying the layer 1 firmware into the third memory 114 can increase a speed of checking the layer 1 firmware. Similarly, the security core 111 may also copy the layer 1 firmware check related information into the third memory 114, to increase the speed of checking the layer 1 firmware. In other words, the security core 111 checks the layer 1 firmware stored in the third memory 114.

Optionally, in some other embodiments, the security core 111 may copy the layer 1 firmware into the third memory 114 after successfully checking the layer 1 firmware. In other words, the security core 111 checks the layer 1 firmware stored in the memory outside the security core module 110.

The security core 111 may determine locations, in the memory, of the layer 1 firmware check related information and the layer 1 firmware based on an information header. The information header may indicate an offset location, in the memory, of each piece of information in the layer 1 firmware check related information and a size of each piece of information. For example, the information header may indicate an offset location, in the memory, of the first root public key and a size of the first root public key, and indicate an offset location, in the memory, of the signature result of the secondary public key and a size of the signature result of the secondary public key. The information header may further indicate an offset location, in the memory, of the layer 1 firmware and a size of the layer 1 firmware. The information header is merely used as an example for description, and the information header may alternatively indicate other content.

A process of checking the layer 1 firmware by the security core 111 based on the first check information and the layer 1 firmware check related information is as follows:

301. If the first memory 112 includes a secure boot indicator bit, first determine whether the secure boot indicator bit is enabled; and if the secure boot indicator bit is enabled, check the first root public key in the layer 1 firmware check related information by using the hash of the first root public key that is stored in the first memory 112; or if the secure boot indicator bit is not enabled, skip checking the firmware. In this case, it may be considered that the layer 1 firmware is successfully checked.

Further, a process of checking the first root public key in the layer 1 firmware check related information by using the hash of the first root public key includes: calculating a hash of the first root public key, and comparing the calculated hash of the first root public key with the hash of the first root public key that is stored in the first memory 112, to determine whether the two hashes are the same. If the two hashes are the same, the first root public key is successfully checked, and step 302 is performed; or if the two hashes are different, the check fails. If the first memory 112 includes no secure boot indicator bit, the first root public key may be checked directly by using the hash of the first root public key that is stored in the first memory 112.

302. Perform a signature check on the signature result of the secondary public key in the layer 1 firmware check related information by using the first root public key, and if the signature check succeeds, perform 303, or if the check fails, return a check failure.

Because step 302 is performed after the first root public key is successfully checked, it can be ensured that the first root public key used in step 302 is trustworthy.

Further, the to-be-checked signature result of the secondary public key is generated in the following manner: performing a hash operation on the secondary public key to obtain a hash of the secondary public key, and encrypting (that is, performing signature processing on) the hash of the secondary public key by using a first root private key, to obtain the signature result of the secondary public key.

A process of performing the signature check on the signature result of the secondary public key by using the first root public key includes: decrypting the signature result of the secondary public key by using the first root public key, to obtain a hash; performing hash calculation on the secondary public key, to obtain another hash; and comparing the two hashes to determine whether the two hashes are the same, and if the two hashes are the same, the signature check on the signature result of the secondary public key succeeds, or if the two hashes are different, the check fails.

303. Determine, based on the first revocation identification information stored in the first memory 112, whether the secondary key ID in the layer 1 firmware check related information has been revoked, and if the secondary key identifier has not been revoked, perform step 304, or if the secondary key identifier has been revoked, the check fails.

In some embodiments, the first revocation identification information may include the secondary key identifier that has been revoked. In this case, if the first revocation identification information does not include the secondary key identifier, it is determined that the secondary key identifier has not been revoked; or if the first revocation identification information includes the secondary key identifier, it is determined that the secondary key identifier has been revoked.

Optionally, in some other embodiments, the first revocation identification information may include the secondary key identifier that has not been revoked. In this case, if the first revocation identification information includes the secondary key identifier, it is determined that the secondary key identifier has not been revoked; or if the first revocation identification information does not include the secondary key identifier, it is determined that the secondary key identifier has been revoked.

In some embodiments, step 303 may not be performed. In other words, in some embodiments, whether the secondary key identifier has been revoked does not need to be determined. In this case, the layer 1 firmware check related information does not need to include the secondary key identifier, and correspondingly, the first check information does not need to include the first revocation identification information, either. It can be understood that, if step 303 does not need to be performed, step 304 may be directly performed after the signature check in step 302 succeeds.

304. Perform a signature check on the signature result of the layer 1 firmware and the layer 1 firmware version number by using the secondary public key, and if the signature check succeeds, perform step 305, or if the check fails, return a check failure.

Further, the to-be-checked signature result of the layer 1 firmware and the layer 1 firmware version number may be generated in the following two manners.

Manner 1: Performing a hash operation on the layer 1 firmware and the layer 1 firmware version number to obtain a hash; and encrypting (that is, performing signature processing on) the hash by using a secondary private key, to obtain the signature result of the layer 1 firmware and the layer 1 firmware version number.

Manner 2: Performing a hash operation on the layer 1 firmware to obtain a hash of the layer 1 firmware; performing a hash operation on the hash of the layer 1 firmware and the layer 1 firmware version number to obtain a hash; and encrypting (that is, performing signature processing on) the hash by using a secondary private key, to obtain the signature result of the layer 1 firmware and the layer 1 firmware version number.

If the signature result of the layer 1 firmware and the layer 1 firmware version number is determined in Manner 1, a process of performing the signature check on the signature result of the layer 1 firmware and the layer 1 firmware version number by using the secondary public key includes: decrypting the signature result of the layer 1 firmware and the layer 1 firmware version number by using the secondary public key, to obtain a hash; performing a hash operation on the layer 1 firmware and the layer 1 firmware version number to obtain a hash; and comparing the two hashes to determine whether the two hashes are the same, and if the two hashes are the same, the signature check on the signature result of the layer 1 firmware and the layer 1 firmware version number succeeds, or if the two hashes are different, the check fails.

If the signature result of the layer 1 firmware and the layer 1 firmware version number is determined in Manner 2, a process of performing the signature check on the signature result of the layer 1 firmware and the layer 1 firmware version number by using the secondary public key includes: decrypting the signature result of the layer 1 firmware and the layer 1 firmware version number by using the secondary public key, to obtain a hash; performing a hash operation on the hash of the layer 1 firmware and the layer 1 firmware version number to obtain a hash; and comparing the two hashes to determine whether the two hashes are the same, and if the two hashes are the same, the signature check on the signature result of the layer 1 firmware and the layer 1 firmware version number succeeds, or if the two hashes are different, the check fails.

305. Determine, based on the first security version number information stored in the first memory 112, whether the layer 1 firmware version number is a security version number, and if the layer 1 firmware version number is the security version number, perform step 306, or if the layer 1 firmware version number is not the security version number, the check fails.

In some embodiments, the first security version number information may include the security version number. In this case, if the first security version number information includes the layer 1 firmware version number, the layer 1 firmware version number is the security version number; or if the first security version number information does not include the layer 1 firmware version number, the layer 1 firmware version number is not the security version number.

Optionally, in some other embodiments, the first security version number information may include a non-security version number. In this case, if the first security version number information does not include the layer 1 firmware version number, the layer 1 firmware version number is the security version number; or if the first security version number information includes the layer 1 firmware version number, the layer 1 firmware version number is not the security version number.

In some embodiments, step 305 may not be performed. In other words, in some embodiments, whether the layer 1 firmware version number is the security version number does not need to be determined. In this case, the layer 1 firmware check related information does not need to include the layer 1 firmware version number, and correspondingly, the first check information does not need to include the first security version number information, either. It can be understood that, if step 305 does not need to be performed, step 306 may be directly performed after the signature check in step 304 succeeds. Further, if the layer 1 firmware check related information does not include the layer 1 firmware version number, the layer 1 firmware check related information should include a signature result of the layer 1 firmware instead of the signature result of the layer 1 firmware and the layer 1 firmware version number. Correspondingly, an objected checked in step 304 is the signature result of the layer 1 firmware instead of the signature result of the layer 1 firmware and the layer 1 firmware version number.

306. Perform hash calculation on the layer 1 firmware to obtain a hash of the layer 1 firmware; and compare the hash with the hash of the layer 1 firmware corresponding to the signature check that has been performed in step 304, and if the two hashes of the layer 1 firmware are the same, the check on the layer 1 firmware succeeds, or if the two hashes of the layer 1 firmware are different, the check fails.

When successfully checking the layer 1 firmware, the security core 111 may perform a method shown in FIG. 4, to generate a layer 1 private key and a layer 1 public key.

FIG. 4 is a schematic flowchart for generating a layer 1 private key and a layer 1 public key according to an embodiment of various embodiments.

401. When successfully checking the layer 1 firmware based on the first check information, the security core 111 continues to execute the Boot-Rom code stored in the second memory 113, to generate a CDI.

Further, the security core 111 may determine the CDI based on a UDS and a hash of the layer 1 firmware, and transfer the CDI to the layer 1 firmware, such that the layer 1 firmware determines the layer 1 private key and public key based on the CDI. A manner of transferring the CDI may be storing the CDI to the third memory 114.

The security core 111 may be configured to perform one-way calculation based on the UDS and the hash of the layer 1 firmware by using a one-way function, to generate the CDI. The one-way function for one-way calculation may be hashed-based message authentication code (HMAC), the secure hash algorithm (SHA)-256, SHA-512, the MD5 message digest algorithm, or the like.

For example, the security core 111 may be configured to calculate HMAC(UDS, Hash(Layer 1)) to generate the CDI, where UDS represents the UDS stored in the first memory 112, and Hash(Layer 1) represents hashing of the layer 1 firmware. HMAC(UDS, Hash(Layer 1)) means performing an HMAC signature on the hash of the layer 1 firmware by using the UDS as a key, and an obtained signature is the CDI.

402. After calculating the CDI, the security core 111 may run the layer 1 firmware to generate the layer 1 private key and the layer 1 public key, and store the generated layer 1 private key to the third memory 114, where the layer 1 public key may be stored in a memory outside the security core module 110 such as the memory 130, or may be stored in a memory outside the chip 100 such as a memory in a server.

An asymmetric cryptographic algorithm used for generating the layer 1 public key and the layer 1 private key may be a Rivest-Shamir-Adleman (RSA) cryptographic algorithm, such as RSA-2048, RSA-3072, or RSA-4096, or may be an elliptic curve cryptography (ECC) algorithm, such as ECC 256, ECC 384, or ECC 512.

In some embodiments, each time after the chip 100 is powered on, the UDS stored in the first memory 112 is allowed to be read only once.

As described above, any other device outside the security core module 110 cannot access a component inside the security core module 110, or can access a component inside security core module 110 only when the service core 120 is in a security mode. In this way, the layer 1 private key stored in the third memory 114 cannot be leaked. This can avoid a risk of forging a layer 2 certificate by using the layer 1 private key.

Further, in a phase of producing the chip 100, the security core 111 may further send layer 1 certificate information to a certificate authority device through the security core module communications interface 115; and receive, through the security core module communications interface 115, the layer 1 certificate information that is signed by using a CA private key ("CA signature layer 1 certificate") and that is sent by the certificate authority device.

The layer 1 certificate information may be a variety of information including the layer 1 public key. Optionally, in some other embodiments, in addition to the layer 1 public key, the layer 1 certificate information may include an identity of the layer 1 firmware. The identity of the layer 1 firmware may be the hash of the layer 1 firmware.

In some embodiments, the layer 1 certificate information may be a layer 1 certificate generated by the security core 111. The layer 1 certificate includes the layer 1 public key. The layer 1 certificate may further include an identity of the layer 1 firmware, and the identity of the layer 1 firmware may be the hash of the layer 1 firmware.

Optionally, in some other embodiments, the layer 1 certificate information may be a self-signed certificate obtained after the security core 111 performs self-signature. Further, the security core 111 may generate a layer 1 certificate, and sign the layer 1 certificate by using the layer 1 private key, to obtain the self-signed certificate. Therefore, the self-signed certificate includes the layer 1 public key. The self-signed certificate may further include an identity of the layer 1 firmware, and the identity of the layer 1 firmware may be the hash of the layer 1 firmware. Signing the layer 1 certificate by using the layer 1 private key can ensure integrity of the layer 1 certificate. If some bytes in the layer 1 certificate are modified in a transfer process, the modifications may also be identified.

Optionally, in some other embodiments, the layer 1 certificate information may be a certificate signing request (CSR), where the CSR includes a layer 1 certificate generated by the security core 111. Therefore, the CSR includes the layer 1 public key. The CSR may further include an identity of the layer 1 firmware, and the identity of the layer 1 firmware may be the hash of the layer 1 firmware.

Correspondingly, the CA signature layer 1 certificate includes the layer 1 public key. If the layer 1 certificate information further includes the identity of the layer 1 firmware, the CA signature layer 1 certificate may further include the identity of the layer 1 firmware.

Further, in the phase of producing the chip 100, the security core 111 may perform the method shown in FIG. 2, to generate the layer 1 private key and the layer 1 public key and generate the layer 1 certificate information based on the layer 1 public key. The chip 100 may be coupled to the certificate authority device, to send the layer 1 certificate information to the certificate authority device. The certificate authority device sends the layer 1 certificate information to a CA. The CA signs the layer 1 certificate information by using the CA private key, to obtain the CA signature layer 1 certificate, and sends the CA signature layer 1 certificate to the certificate authority device; and the certificate authority device sends the received CA signature layer 1 certificate to the security core module 110 inside the chip 100.

In some embodiments, the security core module 110 may communicate with the first communications interface 140 through an internal connection path. In this case, the layer 1 certificate information may be directly sent to the certificate authority device through the first communications interface 140 of the chip 100.

In addition, as described above, the security core 111 can access a component outside the security core module 110. Therefore, in some other embodiments, the layer 1 certificate information may be sent to the certificate authority device by using the service core 120. Further, the security core 111 may send the layer 1 certificate information to the service core 120 through the security core module communications interface 115, and the service core 120 may send the layer 1 certificate information to the certificate authority device through the first communications interface 140.

Although the security core module 110 prevents access of the component outside the security core module 110, the component outside the security core module 110 may send some information to the security core module 110. Therefore, in some embodiments, the CA signature layer 1 certificate that is sent by the certificate authority device and that is received by the first communications interface 140 may be directly sent to the security core module communications interface 115. The security core 111 obtains the CA signature layer 1 certificate received by the security core module communications interface 115.

In some embodiments, the first communications interface 140 may send the received CA signature layer 1 certificate to the service core 120. The service core 120 may write the received CA signature layer 1 certificate into storage space of the memory 130. The storage space is storage space shared by the service core 120 with the security core 111. In other words, both the service core 120 and the security core 111 can access the storage space, and read data stored in the storage space or write data into the storage space. The security core 111 may periodically access the storage space through the security core module communications interface 115. If determining that the storage space stores the CA signature layer 1 certificate, the security core 111 obtains the CA signature layer 1 certificate through the security core module communications interface 115.

Although the security core module 110 prevents access of the component outside the security core module 110, the service core 120 may send some indication information to the security core 111. Therefore, in some other embodiments, the first communications interface 140 may send the received CA signature layer 1 certificate to the service core 120. The service core 120 may write the received CA signature layer 1 certificate into the storage space of the memory 130, and then send indication information to the security core 111, where the indication information instructs the security core 111 to read the storage space. After receiving the indication information, the security core 111 reads the storage space through the security core module communications interface 115, to obtain the CA signature layer 1 certificate.

In some embodiments, the chip 100 may further include a second communications interface (not shown in the figure). The service core 120 may communicate with the second communications interface through an internal connection path, but the service core 120 cannot communicate with the first communications interface 140. In other words, the chip 100 may include two communications interfaces used for performing communication with a device outside the chip. The security core module 110 may communicate with the device outside the chip through one (for example, the first communications interface) of the two communications interfaces, and the service core 120 may communicate with the device outside the chip through the other communications interface (for example, the second communications interface). There is no connection path between the security core module 110 and the second communications interface, and there is no connection path between the service core 120 and the first communications interface, either. In this case, no communications interface is shared between the security core module 110 and the service core 120. In this way, the security core module 110 can be further isolated from the service core 120, thereby further improving security of the security core module 110.

The security core 111 may send the CA signature layer 1 certificate to a memory through the security core communications interface 115. The memory stores the received CA signature layer 1 certificate. The memory is a non-volatile memory, for example, may be the memory 130; or may be a memory that is disposed outside the chip 100 in a process of producing the chip 100 and that can be accessed by the chip 100.

In some embodiments, when security core firmware has only the layer 1 firmware, after generating the layer 1 public key and the layer 1 private key, the security core 111 may further delete the CDI stored in the third memory 114. After the CDI stored in the third memory 114 is deleted, the trusted identity of the layer 1 firmware is successfully constructed. When the trusted identity of the layer 1 firmware is successfully constructed, the third memory 114 stores the layer 1 private key. The layer 1 private key may be applied to trusted certification.

In addition, when the security core firmware has only the layer 1 firmware, a process of obtaining the CA signature layer 1 certificate (including generating the layer 1 certificate information, sending the layer 1 certificate information to the certificate authority device, receiving the CA signature layer 1 certificate, and writing the CA signature layer 1 certificate into a memory) is implemented by running the layer 1 firmware.

Optionally, in some other embodiments, when the security core firmware includes layer 2 firmware, the layer 1 firmware may be further configured to check the layer 2 firmware, and generate a layer 2 private key, a layer 2 certificate, and a layer 2 public key.

Before generating the layer 2 private key, the layer 2 certificate, and the layer 2 public key, the security core 111 further needs to check the layer 2 firmware, and can generate the layer 2 private key, the layer 2 certificate, and the layer 2 public key only after the check succeeds.

The security core 111 may be configured to execute layer 1 firmware code, to complete checking of layer 2 firmware. Second check information used to check the layer 2 firmware may include a hash of a second root public key, second revocation identification information, and second security version number information. Layer 2 firmware check related information includes the second root public key, a signature result of a secondary public key, the secondary public key, and a signature result of the layer 2 firmware and a layer 2 firmware version number. The layer 2 firmware check related information may further include any one or more of the following information: a secondary key ID and the layer 2 firmware version number. For a process of checking the layer 2 firmware, refer to the process of checking the layer 1 firmware. Details are not described herein again.

It should be noted that the second root public key may be the same as the first root public key. Therefore, the hash of the first root public key may be the same as a hash of the second root public key. A secondary private key used for signature processing on the layer 2 firmware and the layer 2 firmware version number may also be the same as the secondary private key used for signature processing on the layer 1 firmware and the layer 1 firmware version number. In this case, in the process of checking the layer 2 firmware, step 304 may first be performed directly without performing step 301 to step 303 that are in the process of checking the layer 1 firmware.

When successfully checking the layer 2 firmware, the security core 111 further determines layer 2 encryption information based on the CDI and a hash of the layer 2 firmware, and stores the layer 2 encryption information to the third memory 114.

Further, the security core 111 may perform one-way calculation based on the CDI and the hash of the layer 2 firmware by using a one-way function, to generate the layer 2 encryption information. The one-way function for one-way calculation may be HMAC, SHA-256, SHA-512, the MD5 message digest algorithm, or the like.

For example, the security core 111 may calculate HMAC (CDI, Hash(Layer 2)) to generate the layer 2 encryption information, where CDI may be the CDI stored in the third memory 114 or a value obtained by performing an operation on the CDI stored in the third memory 114 and other data, Hash(Layer 2) represents hashing of the layer 2 firmware. HMAC(CDI, Hash(Layer 2)) means performing an HMAC signature on the hash of the layer 2 firmware by using the CDI as a key, and an obtained signature is the layer 2 encryption information.

The security core 111 further generates the layer 2 private key and the layer 2 public key based on the layer 2 encryption information by using an asymmetric cryptographic algorithm, and stores the layer 2 private key to the third memory 114; and issues the layer 2 certificate, and signs the layer 2 certificate by using the layer 1 private key. The layer 2 certificate includes the layer 2 public key and an identity of the layer 2 firmware, and the identity of the layer 2 firmware may be the hash of the layer 2 firmware. The hash of the layer 2 firmware may be obtained by performing a hash operation on the layer 2 firmware.

The third memory 114 stores the layer 1 private key and the layer 2 private key. The layer 2 public key and the signed layer 2 certificate may be stored in a memory outside the security core module 110 such as the memory 130, or may be stored in a memory outside the chip 100 such as a memory in a server. As described above, any other device outside the security core module 110 cannot access a component inside the security core module 110, or can access a component inside security core module 110 only when the service core 120 is in a security mode. In this way, the layer 1 private key and the layer 2 private key that are stored in the third memory 114 cannot be leaked. This can avoid a risk of forging the layer 2 certificate by using the layer 1 private key and a risk of performing fake trusted certification by using the layer 2 private key. The layer 2 public key verifies the trusted certification, and therefore the layer 2 public key does not need to be kept confidential. In this case, the memory that stores the layer 2 public key may be the memory outside the security core module 110, such that another device obtains the layer 2 public key and performs verification by using the layer 2 public key.

The asymmetric cryptographic algorithm used for generating the layer 2 public key and the layer 2 private key may be an RSA cryptographic algorithm, such as RSA-2048, RSA-3072, or RSA-4096, or may be an ECC algorithm, such as ECC 256, ECC 384, or ECC 512.

In some embodiments, an algorithm used for generating the layer 1 certificate may be the same as an algorithm used for generating the layer 2 certificate.

In some other embodiments, an algorithm used for generating the layer 1 certificate may be different from an algorithm used for generating the layer 2 certificate.

In some embodiments, the asymmetric cryptographic algorithm used for generating the layer 2 public key and the layer 2 private key may be the same as the asymmetric cryptographic algorithm used for generating the layer 1 public key and the layer 1 private key.

In some other embodiments, the asymmetric cryptographic algorithm used for generating the layer 2 public key and the layer 2 private key may alternatively be different from the asymmetric cryptographic algorithm used for generating the layer 1 public key and the layer 1 private key.

In some embodiments, the security core 111 may further delete the CDI stored in the third memory 114, after determining the layer 2 encryption information; and delete the layer 1 private key stored in the third memory 114, after signing the layer 2 certificate by using the layer 1 private key. This can avoid that an attacker may forge the layer 2 certificate based on the layer 1 private key due to leakage of the layer 1 private key and the CDI.

In addition, when the security core firmware further includes the layer 2 firmware, the layer 1 firmware may be used to: generate the layer 1 certificate information, and transfer the layer 1 certificate information to the layer 2 firmware. The layer 2 firmware is used to: send the layer 1 certificate information to the certificate authority device, receive the CA signature layer 1 certificate, and write the CA signature layer 1 certificate into a memory.

In some embodiments, the security core module 110 may further include a hardware acceleration engine (not shown in the figure), and the hardware acceleration engine may accelerate the process of checking the layer 1 firmware/layer 2 firmware, and accelerate the process of determining the layer 1 private key, the layer 1 public key, the layer 2 private key, the layer 2 public key, and the layer 2 certificate. Further, the hardware acceleration engine may include at least one of the following hardware: hardware configured to implement the process of checking the layer 1 firmware, hardware configured to implement the process of checking the layer 2 firmware, and hardware configured to implement a cryptography algorithm (for example, at least one of an HMAC, SHA, RSA, or ECC algorithm).

When the security core firmware includes only the layer 1 firmware and the layer 1 private key has been generated, the security core module 110 stores the layer 1 private key, and the memory stores the CA signature layer 1 certificate. The security core 111 may provide, by running the layer 1 firmware, trusted certification for data on which trusted certification needs to be performed. Further, the security core 111 may obtain the layer 1 private key, and sign, by using the layer 1 private key, the data on which trusted certification needs to be performed, so as to provide trusted certification. In addition, the security core 111 may further provide trusted certification of the layer 1 firmware (that is, provide the CA signature layer 1 certificate).

When the security core firmware includes the layer 2 firmware and the layer 2 private key and the layer 2 certificate have been generated, the security core module 110 stores the layer 2 private key, and the memory stores the CA signature layer 1 certificate and the layer 2 certificate that is signed by using the layer 1 private key. The security core 111 may provide, by running the layer 2 firmware, trusted certification for data on which trusted certification needs to be performed. The security core 111 may provide trusted certification of the layer 1 firmware (that is, provide the CA signature layer 1 certificate), and the security core 111 may further provide trusted certification of the layer 2 firmware (that is, provide the layer 2 certificate that is signed by using the layer 1 private key). The security core 111 may further sign, by using the layer 2 private key, the data on which trusted certification needs to be performed, so as to provide trusted certification.

Figure 5:
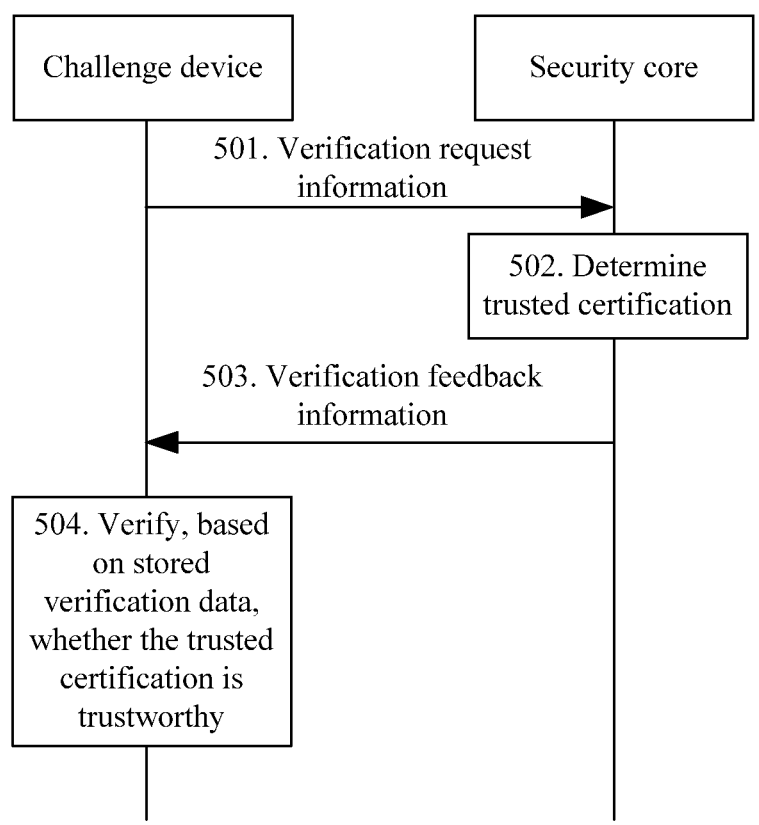
FIG. 5 is a schematic diagram of a trusted certification process according to an embodiment.

With reference to FIG. 5, the following describes a process of providing, by the security core 111, trusted certification for data on which trusted certification needs to be performed. For ease of description, the data on which trusted certification needs to be performed is referred to as target data below.

A type of the target data may include firmware or code run by hardware in a server, a hash of firmware or code running in the server, data generated in a running process of the server, and/or data stored in the server.

For example, the target data may be layer 1 firmware in security core firmware. The target data may alternatively be layer 2 firmware in security core firmware. The target data may alternatively be non-security core firmware or code, such as universal boot loader (U-Boot) code run by the service core inside the chip 100, operating system (OS) kernel firmware, or APP code running in an OS. The target data may alternatively be some data generated in a running process of a security core. The target data may alternatively be some data generated in a running process of other hardware in the server, for example, some data generated by a CPU inside the server. The target data may alternatively be some data stored in a memory in the server.

It should be noted that the embodiment shown in FIG. 5 is described by using an example in which the security core firmware includes the layer 2 firmware. The embodiment shown in FIG. 5 is performed based on completion of trusted identity construction for the layer 2 firmware.

FIG. 5 is a schematic diagram of a trusted certification process according to an embodiment.

501. The security core 111 obtains verification request information sent by a challenge device, where the verification request information obtains trusted certification of target data.

A implementation of the challenge device is not limited in this embodiment of various embodiments, provided that the challenge device can obtain the trusted certification of the target data sent by the security core 111. For example, the challenge device may be a device inside the server. For example, the challenge device may be a CPU inside the server or a BIOS inside the server. The challenge device may alternatively be a device that is outside the server and that can communicate with the server. For example, the challenge device may be a terminal device that can access the server. For another example, the challenge device may be a device configured to verify whether the server is securely running.

Although the security core module 110 prevents access of a component outside the security core module 110, the component outside the security core module 110 may send some information to the security core module 110. Therefore, in some embodiments, the verification request information that is sent by the challenge device and that is received by the first communications interface 140 may be directly sent to the security core module communications interface 115. The security core 111 obtains the verification request information received by the security core module communications interface 115.

In some embodiments, the first communications interface 140 may send the received verification request information to the service core 120. The service core 120 may write the received verification request information into storage space of the memory 130. The storage space is storage space shared by the service core 120 with the security core 111. In other words, both the service core 120 and the security core 111 can access the storage space, and read data stored in the storage space or write data into the storage space. The security core 111 may periodically access the storage space through the security core module communications interface 115. If determining that the storage space stores the verification request information, the security core 111 obtains the verification request information through the security core module communications interface 115.

Although the security core module 110 prevents access of the component outside the security core module 110, the service core 120 may send some indication information to the security core 111. Therefore, in some other embodiments, the first communications interface 140 may send the received verification request information to the service core 120. The service core 120 may write the received verification request information into the storage space of the memory 130, and then send indication information to the security core 111, where the indication information instructs the security core 111 to read the storage space. After receiving the indication information, the security core 111 reads the storage space through the security core module communications interface 115, to obtain the verification request information.

In some embodiments, the verification request information may be used to request to provide trusted certification of all firmware that is run by the security core 111 and the service core 120 inside the chip 100.

In some other embodiments, the verification request information may be used to request to obtain trusted certification of specific firmware.

In some embodiments, the verification request information may be used to request to obtain trusted certification of example data. For example, the example data may be some critical data generated by the service core inside the chip 100. For another example, the example data may be some critical data stored in a memory in the server. For another example, the example data may be some critical data generated by the CPU inside the server.

502. The security core 111 determines the trusted certification of the target data.

In some embodiments, when the target data includes the layer 1 firmware in the security core firmware, trusted certification of the layer 1 firmware in the security core firmware is a CA signature layer 1 certificate.

In some embodiments, when the target data includes the layer 2 firmware in the security core firmware, trusted certification of the layer 2 firmware in the security core firmware is a layer 2 certificate signed by using a layer 1 private key.

In some embodiments, when the target data is firmware (for example, service core firmware) other than the layer 1 firmware in the security core firmware and the layer 2 firmware in the security core firmware, trusted certification of the target data is the firmware or a certificate of the firmware or a hash of the firmware that is signed by using a layer 2 private key.

In some embodiments, when the target data is the example data, trusted certification of the target data is example data or a hash of example data that is signed by using a layer 2 private key.

503. The security core 111 sends verification feedback information to the challenge device, where the verification feedback information includes the trusted certification of the target data.

In some embodiments, the security core module 110 may communicate with the first communications interface 140 through an internal connection path. In this case, the verification feedback information may be directly sent to the challenge device through the first communications interface 140 of the chip 100.

In addition, as described above, the security core 111 can access the component outside the security core module 110. Therefore, in some other embodiments, the verification feedback information may be sent to the challenge device by using the service core 120. Further, the security core 111 may send the verification feedback information to the service core 120 through the security core module communications interface 115. The service core 120 may send the verification feedback information to the challenge device through the first communications interface 140.

504. The challenge device may verify, based on stored verification data, whether the trusted certification of the target data is trustworthy.

If the target data is the layer 1 firmware in the security core firmware, the verification data may include a CA public key and the layer 1 firmware (or a hash of the layer 1 firmware). If the target data is the layer 2 firmware in the security core firmware, the verification data may include a layer 1 public key and the layer 2 firmware (or a hash of the layer 2 firmware). If the target data is the example data, the verification data may include a layer 2 public key and the example data (or the hash of the example data). If the target data is the firmware other than the layer 1 firmware in the security core firmware and the layer 2 firmware in the security core firmware, the verification data may include a layer 2 public key and the firmware (or the hash of the firmware).

The verification data may be pre-obtained by the challenge device and stored in the challenge device. For example, the challenge device may obtain and store the hash of the firmware. The following describes, by assuming that the target data is layer 3 firmware (namely, U-Boot code of the service core that is referred to as the layer 3 firmware for short below) of the chip 100, a process of verifying trusted certification by the challenge device based on the stored verification data.

The security core 111 signs, by using the layer 2 private key, a hash of the layer 3 firmware currently run by the service core, to obtain a signature result of the hash of the layer 3 firmware; and sends, to the challenge device, the signature result of the hash of the layer 3 firmware as trusted certification. The challenge device pre-stores the layer 2 public key and the hash of the layer 3 firmware. The challenge device decrypts the received trusted certification (that is, the signature result of the hash of the layer 3 firmware that is obtained by signing the hash of the layer 3 firmware by using the layer 2 public key) by using the layer 2 public key, to obtain a hash. The challenge device compares the hash (that is, the hash obtained by decrypting the received trusted certification by using the layer 2 public key) with the hash of the layer 3 firmware that is stored in the challenge device, to determine whether the two hashes are the same. If the two hashes are the same, the challenge device may determine that the layer 3 firmware run by the service core inside the chip 100 is trustworthy (that is, not tampered with). In some embodiments, the challenge device may alternatively store hashes of a plurality of pieces of layer 3 firmware, and hashes of different layer 3 firmware may be corresponding to hashes of layer 3 firmware with different versions. The challenge device may determine whether the hash (that is, the hash obtained by decrypting the received trusted certification by using the layer 2 public key) is a hash of one piece of layer 3 firmware that is stored in the challenge device. If the hash is a hash of one piece of layer 3 firmware that is stored in the challenge device, the challenge device may determine, based on a correspondence between a hash of layer 3 firmware and a version of the layer 3 firmware, a version of the layer 3 firmware run by the service core, and may determine that the layer 3 firmware run by the service core is trustworthy (that is, not tampered with). If the hash is not a hash of one piece of layer 3 firmware that is stored in the challenge device (that is, the challenge device does not store the hash), the challenge device determines that the layer 3 firmware run by the service core inside the chip 100 is untrustworthy.

For another example, the trusted certification is example data obtained after being signed by using the layer 2 private key. The challenge device may decrypt the trusted certification by using the layer 2 public key, to obtain example data. If the example data (that is, the example data obtained by decrypting the layer 2 public key) is the same as example data that is sent by the server and that is received by the challenge device, it may be determined that the example data is sent by the server, and that the example data is not tampered with when being sent from the server to the challenge device.

For another example, the trusted certification is the CA signature layer 1 certificate. The challenge device may decrypt the CA signature layer 1 certificate by using the CA public key, to obtain layer 1 certificate information. Each time the chip 100 is started, the process of generating the layer 1 private key and the layer 1 public key by the security core 111 shown in FIG. 2 is performed. If the layer 1 firmware is unchanged, each time the security core 111 performs the method shown in FIG. 2, a same layer 1 private key and a same layer 1 public key are generated by the security core 111. The challenge device determines whether a layer 1 public key in the layer 1 certificate information is the same as a layer 1 public key that is generated when the security core 111 is started. If the two layer 1 public keys are different, it indicates that the layer 1 firmware is tampered with; or if the two layer 1 public keys are the same, it indicates that the layer 1 firmware is the same as the layer 1 firmware used in a phase of producing the chip 100.

As described above, the challenge device may be a device inside the server. The challenge device inside the server may determine, through the trusted certification process, whether a running environment around the challenge device is secure. For example, the target data may be a hash of firmware (such as OS code or APP code) run by the service core inside the chip 100. Through the trusted certification process, whether the firmware code run by the service core is tampered with may be determined, or a version of the firmware run by the service core may be determined.

As described above, the challenge device may be a device configured to verify whether the server is securely running. The challenge device may determine, through the trusted certification process, whether the firmware run by the server is trustworthy firmware.

As described above, the challenge device may be a terminal device that can access the server. Through the trusted certification process, the challenge device can ensure that data received from the server is not tampered with.

The following describes the trusted certification process by using a server as an example. A person skilled in the art can understand that any computer device in which the chip 100 is disposed can implement the trusted certification process shown in FIG. 6.

Figure 6:
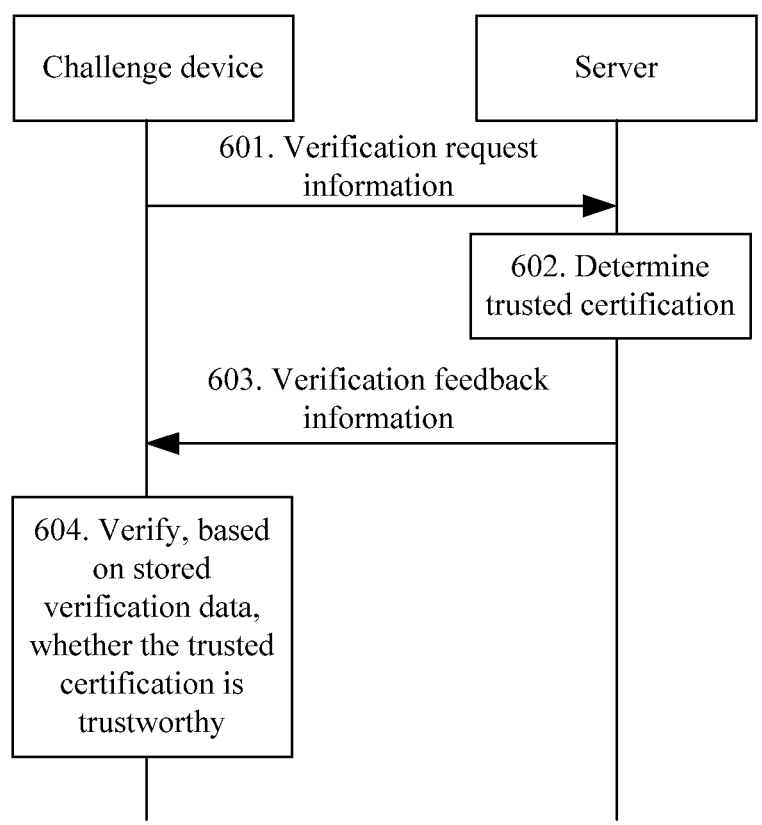
FIG. 6 is a schematic diagram of another trusted certification process according to an embodiment.

FIG. 6 is a schematic diagram of another trusted certification process according to an embodiment.

601. A challenge device sends verification request information to a server, where the verification request information obtains trusted certification of target data.

As described above, the server is a server in which the chip 100 shown in FIG. 1 is disposed. The chip 100 in the server has completed a process of constructing a trusted identity of layer 2 firmware. A security core module inside the chip 100 stores a layer 2 private key. A memory in the server stores a CA signature layer 1 certificate and a layer 2 certificate that is signed by using a layer 1 private key.

Further, a security core in the security core module inside the chip 100 in the server may obtain the verification request information. For a implementation of obtaining the verification request information by the security core, refer to the embodiment shown in FIG. 5. Details are not described herein again.

In some embodiments, the verification request information may be used to request to provide trusted certification of all firmware that is run by the security core and a service core inside the chip 100.

Optionally, in some other embodiments, the verification request information may be used to request to obtain trusted certification of firmware.

In some embodiments, the verification request information may be used to request to obtain trusted certification of example data. For example, the example data may be some critical data generated by a service core inside the chip 100. For another example, the example data may be some critical data stored in a memory in the server. For another example, the example data may be some critical data generated by a CPU inside the server.

602. The server determines the trusted certification of the target data. Further, the security core in the chip 100 in the server may be responsible for determining the trusted certification of the target data.

In some embodiments, when the target data includes layer 1 firmware in security core firmware, the trusted certification of the layer 1 firmware in the security core firmware is the CA signature layer 1 certificate.

In some embodiments, when the target data includes layer 2 firmware in security core firmware, the trusted certification of the layer 2 firmware in the security core firmware is the layer 2 certificate signed by using the layer 1 private key.

In some embodiments, when the target data is firmware other than layer 1 firmware in security core firmware and layer 2 firmware in the security core firmware, the trusted certification of the target data is the firmware or a certificate of the firmware that is signed by using the layer 2 private key.

In some embodiments, when the target data is the example data, the trusted certification of the target data is the example data or a hash of the example data that is signed by using the layer 2 private key.

603. The server sends verification feedback information to the challenge device, where the verification feedback information includes the trusted certification of the target data.

604. The challenge device may verify, based on stored verification data, whether the trusted certification of the target data is trustworthy.

A implementation of verifying the trusted certification by the challenge device, refer to the embodiment shown in FIG. 5. Details are not described herein again.

Figure 7:
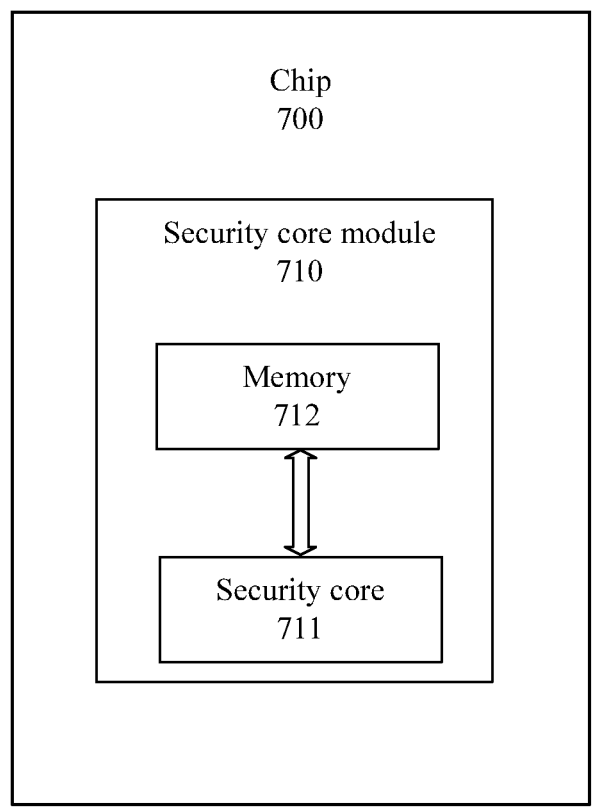
FIG. 7 is a structural block diagram of a chip according to an embodiment.

FIG. 7 is a structural block diagram of a chip according to an embodiment. As shown in FIG. 7, the chip 700 includes a security core module 710, and the security core module 710 includes a security core 711 and a memory 712.

The memory 712 is configured to store a hash of a first root public key and a UDS of the chip 700. The security core 711 is configured to generate a layer 1 public key and a layer 1 private key based on the hash of the first root public key and the UDS of the chip 700. The memory 712 is configured to store the layer 1 private key. For a implementation of generating the layer 1 public key and the layer 1 private key by the security core 711, refer to the flowchart shown in FIG. 2. For a implementation of the memory 712, refer to the descriptions about the first memory, the second memory, and the third memory in the chip shown in FIG. 1. Details are not described herein again.

In some embodiments, the memory 712 is further configured to store a hash of a second root public key. The security core 711 is further configured to generate a layer 2 public key and a layer 2 private key based on the hash of the second root public key and the UDS. The memory 712 is further configured to store the layer 2 private key. The memory 712 is further configured to sign a layer 2 certificate by using the layer 1 private key, where the layer 2 certificate includes the layer 2 public key. Further, generating the layer 2 public key and the layer 2 private key based on the hash of the second root public key and the UDS may be generating the layer 2 public key and the layer 2 private key based on the hash of the second root public key and a CDI that is generated by using the UDS. The second root public key may be the same as or different from the first root public key.

In some embodiments, the security core 711 is further configured to delete the layer 1 private key after signing the layer 2 certificate by using the layer 1 private key.

In some embodiments, the security core 711 is further configured to: run secure firmware when receiving verification request information that is to target data and that is sent by a challenge device, to sign the target data based on the layer 2 private key; and send the signed target data to the challenge device, such that the challenge device verifies the signed target data based on the layer 2 public key. The secure firmware herein is firmware used to implement a trusted certification process. Because the target data is signed by using the layer 2 private key in the trusted certification process, the secure firmware is layer 2 firmware.

In some embodiments, the security core is further configured to: run secure firmware when receiving verification request information that is to target data and that is sent by a challenge device, to sign the target data based on the layer 1 private key; and send the signed target data to the challenge device, such that the challenge device verifies the signed target data based on the layer 1 public key. The secure firmware herein is firmware used to implement a trusted certification process. Because the target data is signed by using the layer 1 private key in the trusted certification process, the secure firmware may be layer 1 firmware. Certainly, if the security core 711 does not delete the layer 1 private key after signing the layer 2 certificate by using the layer 1 private key, the trusted certification process may alternatively be implemented by layer 2 firmware.

In some embodiments, the chip further includes a service core (not shown in the figure) configured to run service firmware.

In some embodiments, the chip further includes a first input/output interface and a second input/output interface (which are not shown in the figure), the first input/output interface is coupled to the security core module, and the second input/output interface is coupled to the service core.

For example functions and beneficial effects of the components in the embodiment shown in FIG. 7, refer to the embodiments shown in FIG. 1 to FIG. 5. Details are not described herein again.

In the following embodiments, that a server serves as a target device in which the chip is disposed is used as an example for description. It can be understood that the chip shown in FIG. 1 or FIG. 7 may be applied to various computer devices, such as a server (for example, a storage server, a database server, or a management server), a terminal device (for example, a mobile terminal or a personal computer), a wearable device, and a network device (for example, a router or a switch).

Figure 8:
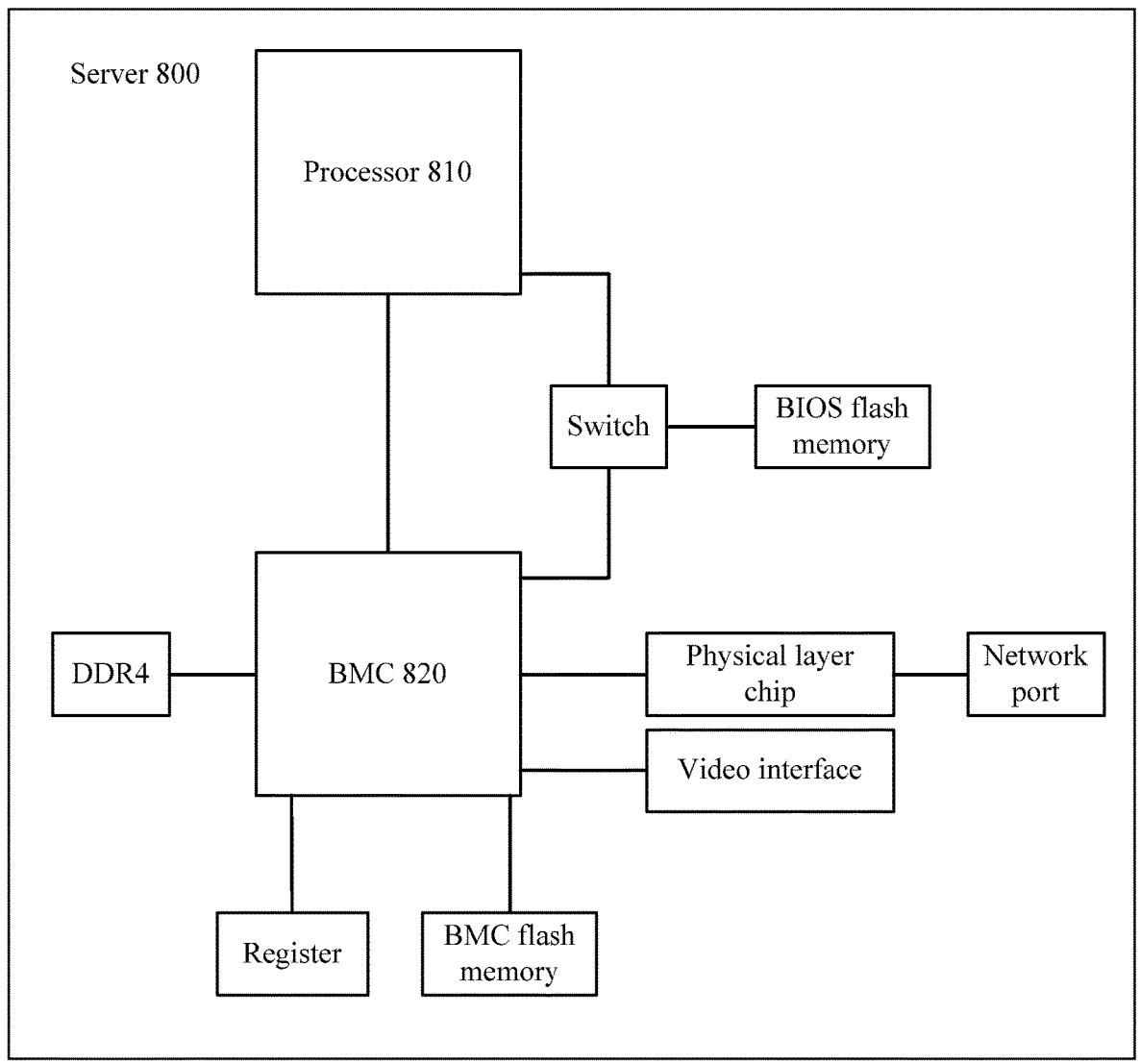
FIG. 8 is a schematic structural diagram of a server according to an embodiment.

FIG. 8 is a schematic structural diagram of a server according to an embodiment of various embodiments.

As shown in FIG. 8, the server 800 includes a processor 810 and a BMC 820. The BMC 820 may be a security chip, the security chip may be the chip 100 shown in FIG. 1 or the chip 700 shown in FIG. 7, and the processor 810 may be, for example, a CPU.

After the server 800 is powered on, the BMC 820 may perform the process shown in FIG. 2, to complete trusted identity construction for layer 1 firmware or further complete trusted identity construction for layer 2 firmware.

The BMC 820 may be further coupled to other components, for example, coupled to a 4th generation double data rate (DDR) memory (DDR4 for short), a register, a BMC flash memory, a video interface, and a physical layer chip (for example, a network adapter).

The DDR4 is configured to provide program or code running space for the BMC 820 or the processor 810.

The BMC flash memory may be a flash memory that stores firmware in the BMC and related data.

The video interface is configured to connect to an external device such as a display. The physical layer chip is coupled to the network port, and is configured to provide data receiving and sending services for the server 800.

Both the BMC 820 and the processor 810 may access a BIOS by using a switch. The processor 810 runs the BIOS stored in a BIOS flash memory. The BMC 820 controls an access path of the BIOS flash memory by switching the switch.

An architecture of the server 800 is merely an example for description, and shall not be construed as any limitation on application of the technical solutions provided in various embodiments. The technical solutions provided in various embodiments may be further applied to a server including more or fewer components.

For example, the server 800 may be a cloud computing server. In this case, the server 800 may include a plurality of computing units. The computing units may be CPUs, graphics processing units (GPUs), digital signal processors (DSPs), application-specific integrated circuits (ASICs), field-programmable gate arrays (FPGAs), neural processing units (NPU), or other types of computing units. The plurality of computing units may constitute a homogenous computing resource pool and/or a heterogeneous computing resource pool, to provide services for a user.

For another example, the server 800 may be a storage server. In this case, the server 800 may include a plurality of storage units. The storage units may be hard disk drives (HDD), solid-state disks (SSD), small computer system interface (SCSI) disks, or other types of non-volatile storage media. When the server 800 includes a plurality of hard disks, the plurality of hard disks may constitute a redundant array of inexpensive disks (RAID) used as a storage resource pool of the server 800, to provide services for a user.

Figure 9:
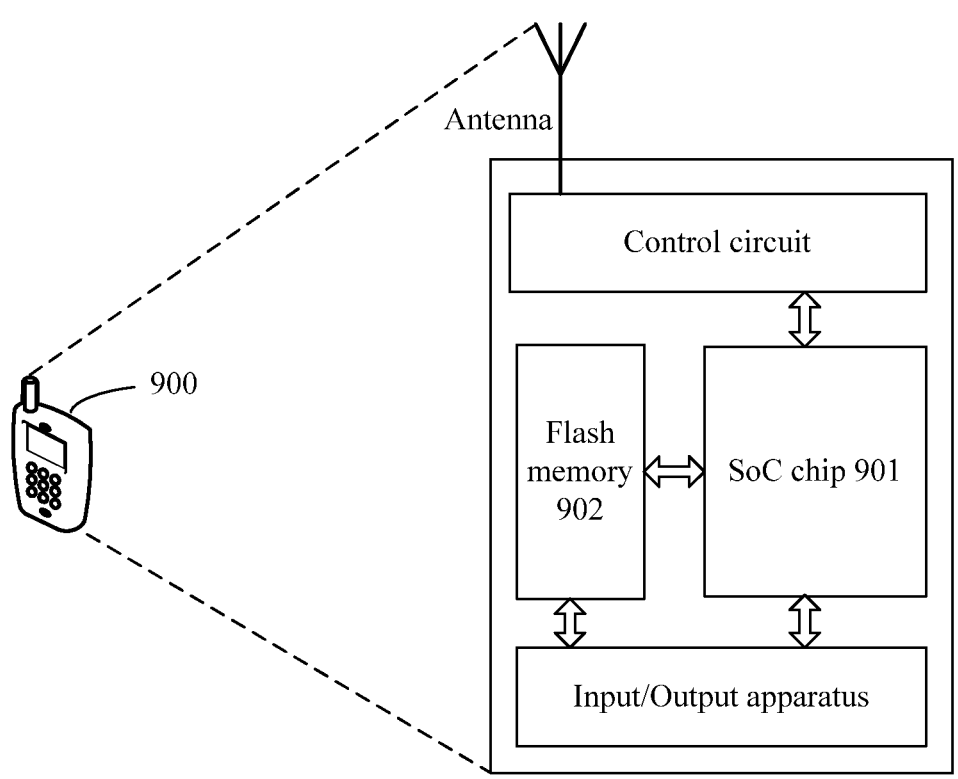
FIG. 9 is a schematic structural diagram of a terminal device according to an embodiment.

FIG. 9 is a schematic structural diagram of a terminal device according to an embodiment of various embodiments.

The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communication function, a computing device, another processing device coupled to a wireless modem, a vehicle-mounted device, a wearable device, or a user device in a 5G communications system. The foregoing electronic devices are merely used as examples for describing the terminal device. The terminal device may alternatively be another electronic device, for example, a car or unmanned aerial vehicle including an SoC chip 901. The SoC chip 901 may be the chip 100 shown in FIG. 1 or the chip 700 shown in FIG. 7.

As shown in FIG. 9, when the terminal device is a mobile phone, the mobile phone 900 includes a security chip 901, a flash memory 902, a control circuit, an antenna, and an input/output apparatus. The SoC chip 901 is mainly configured to: process a communication protocol and communications data, and control the entire terminal device, execute a software program, and process data of the software program. The flash memory 902 is mainly configured to store the software program and data. The SoC chip 901 and the flash memory 902 are configured to provide secure boot assurance for the mobile phone 900 when the mobile phone 900 is powered on. The control circuit is mainly configured to convert between a baseband signal and a radio frequency signal and process a radio frequency signal. The control circuit together with the antenna may alternatively be referred to as a transceiver, which is mainly configured to receive and send radio frequency signals in an electromagnetic wave form. The input/output apparatus such as a touchscreen, a display screen, or a keyboard is mainly configured to receive data entered by a user and output the data to the user.

After the terminal device is powered on, the SoC chip 901 may perform the process shown in FIG. 2, to complete trusted identity construction for layer 1 firmware or further complete trusted identity construction for layer 2 firmware. The SoC chip 901 subsequently runs an OS, reads the software program in the flash memory 902, interprets and executes an instruction of the software program, and processes the data of the software program. The SoC chip 901 may include a baseband chip. When data needs to be sent wirelessly, the baseband chip in the SoC chip 901 performs baseband processing on the to-be-sent data, and outputs a baseband signal to a radio frequency circuit. After performing radio frequency processing on the baseband signal, the radio frequency circuit sends a radio frequency signal by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data and processes the data.

A person skilled in the art can understand that, for ease of description, FIG. 9 shows only one memory, the flash memory 902, and one processor, the SoC chip 901. In an actual terminal device, there may be a plurality of processors and a plurality of memories. The memory may also be referred to as a storage medium, a storage device, or the like. This is not limited in various embodiments.

Figure 10:
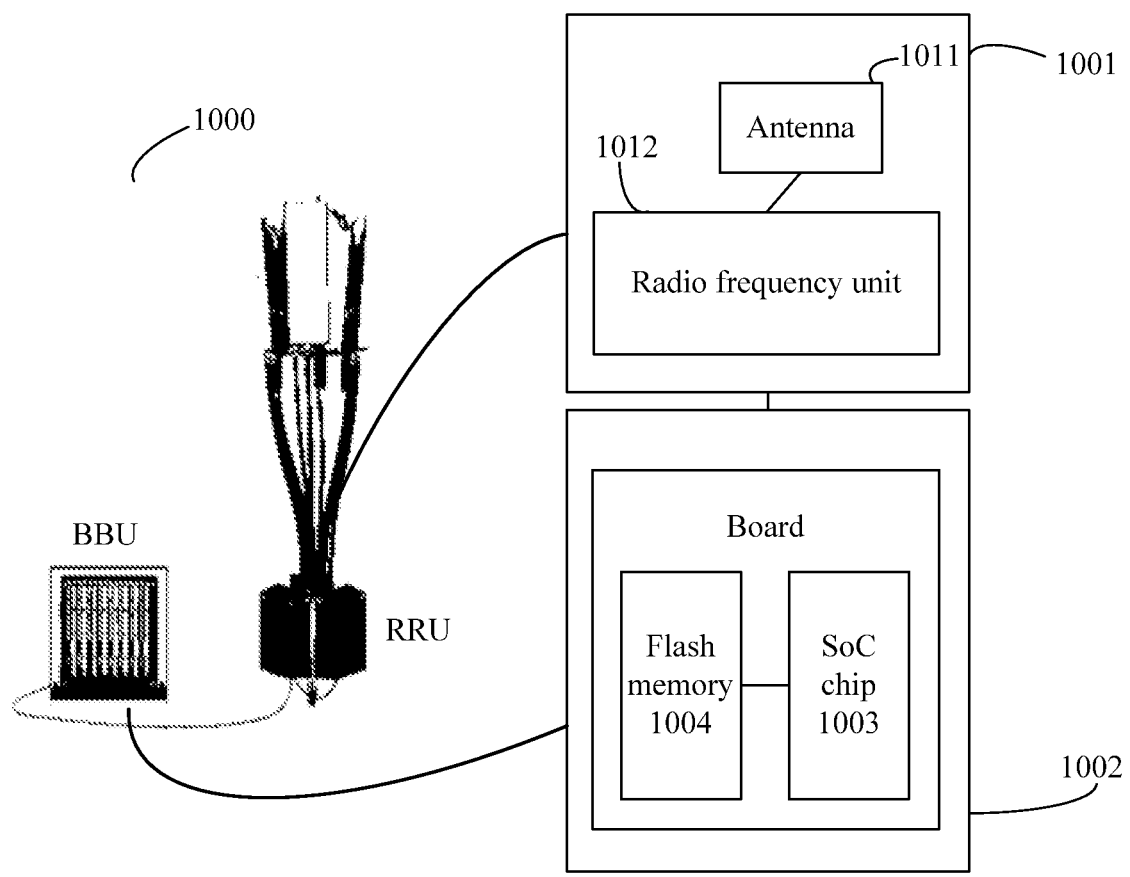
FIG. 10 is a schematic structural diagram of a network device according to an embodiment.

FIG. 10 is a schematic structural diagram of a network device according to an embodiment of various embodiments.

The network device may be a base transceiver station (BTS) in a code-division multiple access (CDMA) system, a NodeB (NB) in a wideband CDMA (WCDMA) system, an evolved NodeB (eNB) in a Long-Term Evolution (LTE) system, or a gNB in a 5G communications system. The foregoing base stations are merely examples for description.

Alternatively, the network device may be a relay node, an access point, a vehicle-mounted device, a wearable device, or a car or unmanned aerial vehicle including a security chip 1003.

As shown in FIG. 10, when the network device is a base station, the base station 1000 may include one or more radio frequency units, for example, a remote radio unit (RRU) 1001, and one or more BBUs or DUs 1002. The RRU 1001 may be referred to as a transceiver unit, a transceiver, a transceiver circuit, or the like, and may include at least one antenna 1011 and a radio frequency unit 1012. The RRU 1001 is mainly configured to receive and send radio frequency signals and convert between a radio frequency signal and a baseband signal. The BBU 1002 is mainly configured to perform baseband processing, control the base station 1000, and the like. An SoC chip 1003 and a flash memory 1004 are integrated into a board in the BBU 1002. The SoC chip 1003 may be the chip 100 shown in FIG. 1 or the chip 700 shown in FIG. 7.

After the base station 1000 is powered on, the SoC chip 1003 may perform the process shown in FIG. 2, to complete trusted identity construction for layer 1 firmware or further complete trusted identity construction for layer 2 firmware.

The SoC chip 1003 and the flash memory 1004 are configured to provide secure boot assurance for the BBU 1002 when the BBU 1002 is started. The RRU 1001 and the BBU 1002 may be physically disposed together; or may be physically disposed separately, that is, the network device is a distributed base station.

As a control center of the base station, the BBU 1002 may also be referred to as a processing unit, and is mainly configured to implement baseband processing functions such as channel coding, multiplexing, modulation, and spectrum spreading.

In an example, the BBU 1002 may include one or more boards, and a plurality of boards may jointly support a radio access network (for example, an LTE network) of a single access standard, or may separately support radio access networks (for example, an LTE network or a 5G network) of different access standards. The SoC chip 1003 and the flash memory 1004 may serve the one or more boards. In other words, a memory and a processor may be disposed on each board. Alternatively, the plurality of boards may share one memory and one processor.

A person of ordinary skill in the art can be aware that, in combination with the examples described in the embodiments disclosed in this specification, units and algorithm steps can be implemented by electronic hardware or a combination of computer software and electronic hardware. Whether these functions are performed by hardware or software depends on particular applications and design constraints of the technical solutions. A person skilled in the art may use a different method to implement the described functions for each particular application, but it should not be considered that the implementation goes beyond the scope of various embodiments.

It can be clearly understood by a person skilled in the art that, for the purpose of convenient and brief description, for detailed working processes of the foregoing systems, apparatuses, and units, reference may be made to corresponding processes in the foregoing method embodiments. Details are not described herein again.

In the several embodiments provided, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments.

In addition, functional units in the embodiments of various embodiments may be integrated into one processing unit, or each of the units may exist alone physically, or at least two units may be integrated into one unit.

The foregoing descriptions are merely example implementations of various embodiments, but are not intended to limit the protection scope of various embodiments. Any variation or replacement readily figured out by a person skilled in the art within the technical scope disclosed in various embodiments shall fall within the protection scope of various embodiments. Therefore, the protection scope of various embodiments shall be subject to the protection scope of the claims.

What is claimed is:

1. A chip comprising:
an external module; and
a security core module comprising:
a memory configured to:
store a first hash of a first root public key and a unique device secret (UDS) of the chip, and
store a layer 1 private key; and
a security core configured to generate a layer 1 public key and the layer 1 private key based on the first hash,
wherein the security core module is configured to prevent access to itself by the external module and by an external device outside the chip.

2. The chip of claim 1, wherein the security core module comprises an address outside an address range that is accessible by the external module and the external device.

3. The chip of claim 2, wherein the memory is further configured to:
store a second hash of a second root public key; and
store a layer 2 private key,
wherein the security core is further configured to:
generate a layer 2 public key and a layer 2 private key based on the second hash; and
sign a layer 2 certificate using the layer 1 private key, wherein the layer 2 certificate comprises the layer 2 public key.

4. The chip of claim 2, wherein the security core is further configured to:
receive verification request information from a challenge device;
run, in response to the verification request information, secure firmware to sign target data based on the layer 1 private key in order to create signed target data; and
send the signed target data to the challenge device to prompt the challenge device to verify the signed target data based on the layer 1 public key.

5. The chip of claim 1, wherein the memory is further configured to:
   store a second hash of a second root public key; and
   store a layer 2 private key,
   wherein the security core is further configured to:
      generate a layer 2 public key and a layer 2 private key based on the second hash, and
      sign a layer 2 certificate using the layer 1 private key, wherein the layer 2 certificate comprises the layer 2 public key.

6. The chip of claim 5, wherein the security core is further configured to:
   sign the layer 2 certificate using the layer 1 private key; and
   delete the layer 1 private key after the signing.

7. The chip of claim 6, wherein the security core is further configured to:
   receive verification request information from a challenge device;
   run, in response to the verification request information, secure firmware to sign target data based on the layer 2 private key in order to create signed target data; and
   send the signed target data to the challenge device to prompt the challenge device to verify the signed target data based on the layer 2 public key.

8. The chip of claim 5, wherein the security core is further configured to:
   receive verification request information from a challenge device;
   run, in response to the verification request information, secure firmware to sign target data based on the layer 2 private key in order to create signed target data; and
   send the signed target data to the challenge device to prompt the challenge device to verify the signed target data based on the layer 2 public key.

9. The chip according to claim 1, wherein the security core is further configured to:
   receive verification request information from a challenge device;
   run, in response to the verification request information, secure firmware to sign target data based on the layer 1 private key in order to create signed target data; and
   send the signed target data to the challenge device to prompt the challenge device to verify the signed target data based on the layer 1 public key.

10. The chip of claim 1, further comprising a service core configured to run service core firmware.

11. The chip of claim 10, further comprising:
   a first input/output (I/O) interface coupled to the security core module; and
   a second I/O interface coupled to the service core.

12. A method comprising:
   storing, by a memory of a security core module of a chip, a first hash of a first root public key and a unique device secret (UDS) of the chip;
   generating, by a security core of the security core module, a layer 1 public key and a layer 1 private key based on the first hash;
   storing, by the memory, the layer 1 private key; and
   preventing, by the security core module, access to itself by an external module of the chip and by an external device outside the chip.

13. The method of claim 12, further comprising:
   storing, by the memory, a second hash of a second root public key and the UDS;
   generating, by the security core, a layer 2 public key and a layer 2 private key based on the second hash;
   storing, by the memory, the layer 2 private key; and
   signing, by the security core, a layer 2 certificate using the layer 1 private key,
   wherein the layer 2 certificate comprises the layer 2 public key.

14. The method of claim 13, further comprising:
   signing, by the security core, the layer 2 certificate using the layer 1 private key; and
   deleting, by the security core after the signing, the layer 1 private key.

15. The method of claim 13, further comprising:
   obtaining, by the security core from a challenge device, verification request information;
   running, by the security core in response to the verification request information, secure firmware to sign target data based on the layer 2 private key in order to create signed target data; and
   sending, by the security core to the challenge device, the signed target data to prompt the challenge device to verify the signed target data based on the layer 2 public key.

16. The method of claim 12, further comprising:
   obtaining, by the security core from a challenge device, verification request information;
   running, by the security core in response to the verification request information, secure firmware to sign target data based on the layer 1 private key in order to create signed target data; and
   sending, by the security core to the challenge device, the signed target data to prompt the challenge device to verify the signed target data based on the layer 1 public key.

* * * * *